(12) United States Patent
Zhu

(10) Patent No.: US 10,569,820 B2
(45) Date of Patent: Feb. 25, 2020

(54) SELF-BALANCING VEHICLES

(71) Applicant: TWO WHEELS TECHNOLOGY, CO., LTD., Daxing District, Beijing (CN)

(72) Inventor: Lingyun Zhu, Beijing (CN)

(73) Assignee: Beijing Lingyun Intelligent Technology CO., Ltd, Beijing (CN)

( * ) Notice: Subject to any disclaimer, the term of this patent is extended or adjusted under 35 U.S.C. 154(b) by 32 days.

(21) Appl. No.: 15/751,487

(22) PCT Filed: Aug. 10, 2015

(86) PCT No.: PCT/CN2015/086523
§ 371 (c)(1),
(2) Date: Feb. 9, 2018

(87) PCT Pub. No.: WO2017/024472
PCT Pub. Date: Feb. 16, 2017

(65) Prior Publication Data
US 2018/0237096 A1    Aug. 23, 2018

(51) Int. Cl.
*B62K 11/00* (2006.01)
*B62H 1/10* (2006.01)
*B62K 3/00* (2006.01)
*G01C 19/30* (2006.01)
*G05D 1/08* (2006.01)

(52) U.S. Cl.
CPC ............ *B62K 11/007* (2016.11); *B62H 1/10* (2013.01); *B62K 3/005* (2013.01); *G01C 19/30* (2013.01); *G05D 1/0891* (2013.01)

(58) Field of Classification Search
CPC ......... B62K 11/007; B62K 3/007; B62H 1/10
See application file for complete search history.

(56) References Cited

U.S. PATENT DOCUMENTS

| | | | |
|---|---|---|---|
| 2010/0274445 A1* | 10/2010 | Haynes | B62H 1/12 701/36 |
| 2012/0217072 A1 | 8/2012 | Hoffmann et al. | |
| 2013/0054126 A1* | 2/2013 | Lazzari | B62D 37/06 701/124 |
| 2013/0233632 A1* | 9/2013 | Kim | B62M 7/12 180/220 |

FOREIGN PATENT DOCUMENTS

| | | |
|---|---|---|
| CN | 2434208 A | 6/2001 |
| CN | 1796225 A | 7/2006 |
| CN | 1817725 A | 8/2006 |
| CN | 201092370 A | 7/2008 |

* cited by examiner

*Primary Examiner* — Abby Y Lin
*Assistant Examiner* — Renee LaRose
(74) *Attorney, Agent, or Firm* — Gang Yu

(57) ABSTRACT

The present disclosure provides systems, methods, and devices for operating a vehicle, such as a self-balancing vehicle, using a steering member and/or a braking member. A resistance to movement of the steering member may be controllable based upon an operating state or change thereof of the vehicle. The braking member may control a resistance to motion of at least one of at least two wheels of the vehicle based upon an operating state or change thereof of the vehicle.

18 Claims, 9 Drawing Sheets

SELF-BALANCING VEHICLES

BACKGROUND

A vehicle is a mobile machine that is capable of transporting objects from one point to another. A vehicle may be used in various settings, such as commercial, personal or recreational settings. A vehicle typically includes a form of locomotion, such as an engine (e.g., internal combustion, compressed gas, or electric motor), which may allow displacement or translation of the vehicle from one point to another. Such locomotion may include a power source to provide the required kinetic energy, in addition to features that enable the vehicle to control motion, such as a braking and steering system.

Examples of vehicles include two, three and four-wheeled vehicles. A two-wheeled vehicle typically has two wheels each in contact with a support surface, such as a road. A three wheeled vehicle typically has three wheels that are each in contact with the support surface, and a four-wheeled vehicle typically has four wheels that are each in contact with the support surface.

Two-wheeled vehicles may include locomotion, such as an engine. As an alternative, a two-wheeled vehicle may not include an engine, but may be self-powered by a user such two-wheeled vehicle may be a bicycle. A two-wheeled vehicle may include other components that enable reliable use, such as self-balancing features that enable the two-wheeled vehicle to balance on a support surface with little or no effort from a user. Two-wheeled vehicles may be widely used in manned or unmanned transportation for the public, military, and recreational uses, due at least in part to their improved maneuverability, power consumption, size and flexibility with respect to four-wheeled vehicles.

SUMMARY

Despite the presence of two-wheeled vehicles, recognized here are various, non-limiting issues with two-wheeled vehicles currently available. The safety of two-wheeled vehicles is a long-term unsolved issue. For example, a two-wheeled vehicle may fall or flip over if it enters a sharp corner at high speed. If such two-wheeled vehicle includes a self-balancing device, the self balancing device may fail if an angle of tilt of the vehicle body exceeds a threshold with respect to the gravitational acceleration vector. In order to increase stability of self-balancing two-wheeled vehicles, it may be desirable to provide a steering feedback to the driver and/or an auxiliary braking to the vehicle when the vehicle is likely to lose stability.

The present disclosure provides systems and methods for providing steering feedback to the driver of the two-wheeled vehicles by providing a steering member. When the balancing member is reaching a limit of providing, stability while the vehicle is steering a sharp angle with a high speed, a resistance to movement of the steering member may be increase such that a feedback is provided to the driver of the vehicle. Upon the balancing member reaches the limit of providing stability, the movement of the steering member may be prohibited to avoid a fall or flip over of the vehicle.

The present disclosure also provides systems and methods for providing auxiliary braking to the two-wheeled vehicles by providing at least one braking member. When the balancing member is reaching a limit of providing stability while the vehicle is steering a sharp angle with a high speed, the braking member may increase a resistance to motion of the wheels of the vehicle so as to prevent an increase in a velocity of the vehicle. Upon the balancing member reaches the limit of providing stability, the braking member may further increase the resistance to motion of the wheels so as to decrease the velocity of the vehicle. In some instances, the steering member and the at least one braking member may be used in combination. For example, if the driver further steers the steering wheel when the balancing member is reaching a limit of providing stability, the braking member may further increase the resistance to motion of the wheels so as to decrease the velocity of the vehicle.

In an aspect of the present disclosure, a self-balancing vehicle may comprise: a vehicle body having a first axis; at least two wheels aligned substantially along the first axis, wherein each of the at least two wheels may be configured to support the vehicle body against a support surface, and wherein at least one of the at least two wheels may be rotatable along a second axis that is angled with respect to the first axis; at least one balancing member disposed within the vehicle body, wherein the balancing member may facilitate self-balancing of the vehicle body against the support surface; a steering member coupled to the at least one of the at least two wheels, wherein the steering member may be movable to provide rotation of the at least one of the at least two wheels along the second axis, wherein a resistance to movement of the steering member may be controllable based upon an operating state or change thereof of the vehicle, which operating state may be selected from the group consisting of a state of the at least one balancing member and a degree of tilt with respect to the gravitational acceleration vector; and a controller in communication with the steering member and the at least one balancing member, wherein the controller may comprise one or more computer processors that are individually or collectively programmed to control the resistance to movement of the steering member based upon the operating state or change thereof of the vehicle.

In some embodiments, the steering member may be rotatable. In some embodiments, t steering member may be substantially circular. Alternatively, the steering, member may include handles.

In some embodiments, the one or more computer processors may be individually or collectively programmed to detect the operating state or change thereof of the vehicle. For instance, the state of the at least, one balancing member may be an operational state, a faulty state or a non-operational state.

In some embodiments, the one or more computer processors may be individually or collectively programmed to direct the steering member to increase or decrease the resistance to movement. Alternatively, the one or more computer processors may be individually or collectively programmed to direct the steering member to maintain the resistance to movement.

In some embodiments, the state of the at least one balancing member may be indicative of the balancing member being in a faulty or non-operational state, and wherein the one or more computer processors may be individually or collectively programmed to control the resistance to movement when the balancing member is in the faulty or non-operational state.

Alternatively, the state of the at least one balancing member may be indicative of the balancing member being in an operational state, and wherein the one or more computer processors may be individually or collectively programmed to (i) detect the state of the at least one balancing member, and (ii) control the resistance to movement of the steering member based upon the state of the at least one balancing member. In some embodiments, the one or more computer processors may be individually or collectively programmed to increase the resistance to movement of the steering member before the state of the at least one balancing member transitions from the operational state to a non-operational state. Alternatively, the one or more computer processors may be individually or collectively programmed to prohibit movement of the steering member upon the state of the at least one balancing member transitioning from the operational state to a non-operational state.

In some embodiments, the state of the at least one balancing member may be indicative of the balancing member being in an operational state, and wherein the one or more computer processors may be individually or collectively programmed to (i) detect the degree of tilt or change thereof with respect to the gravitational acceleration vector, and (ii) control the resistance to movement based upon the degree of tilt or change thereof. In some embodiments, the one or more computer processors may be individually or collectively programmed to increase the resistance to movement of the steering member when the degree of tilt or change thereof with respect to the gravitational acceleration vector reaches a predetermined orientation threshold. In some instance, the predetermined orientation threshold may be at least 30 degrees. In some embodiments, the one or more computer processors may be individually or collectively programmed to increase the resistance to movement of the steering member before the degree of tilt or change thereof with respect to the gravitational acceleration vector reaches the predetermined orientation threshold. Alternatively, the one or more computer processors may be individually or collectively programmed to prohibit movement of the steering member upon the degree of tilt or change thereof reaching the predetermined orientation threshold.

In some embodiments, the balancing member may include a control moment gyroscope (CMG). In some embodiments, the operating state of the CMG may be determined based upon whether a gimbal angle of the CMG with respect to the vehicle body reaches a predetermined gimbal angle limit. In some embodiments, the one or more computer processors may be individually or collectively programmed to increase the resistance to movement of the steering member when the gimbal angle of the CMG reaches 80% of the predetermined gimbal angle limit. For instances, the limit may be ±45 degrees.

In some embodiments, the balancing member may include a flywheel. In some embodiments, the operating state of the at least one balancing member may include an operating state of the flywheel that is determined based upon whether a rate of rotation of the flywheel reaches a predetermined limit. In some embodiments, the one or more computer processors may be individually or collectively programmed to increase the resistance to movement of the steering member when the rate of rotation of the flywheel reaches 80% of the predetermined limit. For instance, the limit may be at least 5000 rpm.

In some embodiments, the balancing member may include a shifting weight. In some embodiments, the shifting weight may be movable along a direction substantially perpendicular to the first axis of the vehicle body. In some embodiments, the operating state of the at least one balancing member may include an operating state of the shifting weight that is determined based upon whether a mass of the shifting weight reaches an end of a sliding rod, along which the mass slides. In some embodiments, the one or more computer processors may be individually or collectively programmed to increase the resistance to movement of the steering member when the mass of the shifting weight reaches 80% of a length of the sliding rod.

In some embodiments, the self-balancing vehicle may further comprise a motor that provides translational motion to the vehicle body. In some embodiments, the motor may be an internal combustion engine. Alternatively, the motor may be an electric motor. In some embodiments, the motor may be operatively coupled to at least one of the at least two wheels. In some embodiments, the motor may be operatively coupled to the at least two wheels.

In some embodiments, the at least two wheels may be operatively coupled to one another. In some embodiments, both of the at least two wheels may be steerable. In some embodiments, the at least two wheels may be independently steerable. Alternatively, the at least two wheels may be concertedly steerable.

In some embodiments, the balancing member may provide self-balancing to the vehicle body while the vehicle body is moving with respect to the support surface. In some embodiments, the balancing member may provide self-balancing to the vehicle body while the vehicle body is stationary with respect to the support surface. Alternatively, the balancing member may not provide self-balancing to the vehicle body while the vehicle body is stationary with respect to the support surface. In some embodiments, the one or more computer processors may be individually or collectively programmed to direct the balancing member to provide self-balancing to the vehicle body when the vehicle body has transitioned from a stationary state to a moving state with respect to the support surface.

In some embodiments, the first axis may be a longitudinal axis. In some embodiments, the second axis may be angled with respect to the first axis at an angle greater than 0°. Alternatively, the angle may be greater than or equal to 25°. Alternatively, the angle may be greater than or equal to 45°. Alternatively, the second axis may be substantially orthogonal to the first axis.

In some embodiments, the at least one balancing member may comprise a plurality of balancing members. In some embodiments, the plurality of balancing members may comprise a first balancing member adjacent to a second balancing member. In some embodiments, the first balancing member may be adjacent to the second balancing member along an axis that is orthogonal to the first axis. Alternatively, the first balancing member may be adjacent to the second balancing member along the first axis. In some embodiments, the first balancing member and second balancing member include masses that rotate in opposite directions.

In some embodiments, the self-balancing vehicle may further comprise one or more sensors for detecting the degree of tilt of the vehicle body. In some embodiments, the one or more sensors may include a gyroscope that detects the degree of tilt of the vehicle body with respect to the gravitational acceleration vector.

In some embodiments, the one or more computer processors may be individually or collectively programmed to direct the steering member to modulate the resistance to movement based upon the operating state or change thereof of the vehicle. In some embodiments, the resistance to movement may be modulated at a frequency of at least about 2 Hz.

In some embodiments, the self-balancing vehicle may further comprise at least one braking member coupled to at least one of the at least two wheels. In some embodiments, the at least one braking member may control a resistance to motion of the at least one of the at least two wheels against the support surface based upon the operating state or change thereof of the vehicle.

In some embodiments, the steering member may comprise a breaking, unit that regulates the resistance to movement of the steering member.

In another aspect of the present disclosure, A self-balancing vehicle may comprise: a vehicle body having a first axis; at least two wheels aligned substantially along the first axis, wherein each of the at least two wheels may be configured to support the vehicle body against a support surface; at least one balancing member disposed within the vehicle body, wherein the balancing member may facilitate self-balancing of the vehicle body against the support surface; at least one braking member coupled to at least one of the at least two wheels, wherein the at least one braking member may control a resistance to motion of the at least one of the at least two wheels against the support surface based upon an operating state or change thereof of the vehicle, which operating state may be selected from the group consisting of a state of the at least one balancing member and a degree of tilt with respect to the gravitational acceleration vector; and a controller in communication with the at least one braking member and the at least one balancing member, wherein the controller may comprise one or more computer processors that are individually or collectively programmed to control the resistance to motion based upon the operating state or change thereof of the vehicle.

In some embodiments, at least one of the at least two wheels may be rotatable along a second axis that is angled with respect to the first axis. In some embodiments, the first axis may be a longitudinal axis.

In some embodiments, the braking member may be coupled to the at least two wheels, and wherein the braking member may control a resistance to motion of the at least two wheels against the support surface based upon the operating state or change thereof of the vehicle. In some embodiments, the at least one braking member may comprise at least two braking members. In some embodiments, the at least one braking member may include a braking unit that is in contact with the at least one of the at least two wheels.

In some embodiments, the one or more computer processors may be, individually or collectively programmed to detect the operating state or change thereof of the vehicle. In some embodiments, the state of the at least one balancing member may be an operational state, a faulty state or a non-operational state.

In some embodiments, the one or more computer processors may be individually or collectively programmed to direct the at least one braking member to increase or decrease the resistance to motion. Alternatively, the one or more computer processors may be individually or collectively programmed to direct the at least one braking member to maintain the resistance to motion.

In some embodiments, the state of the at least one balancing member may be indicative of the balancing member being in a faulty or non-operational state, and wherein the one or more computer processors may be individually or collectively programmed to control the resistance to motion to stop the vehicle when the balancing member is in the faulty or non-operational state. Alternatively, the state of the at least one balancing member may be indicative of the balancing member being in an operational state, and wherein the one or more computer processors may be individually or collectively programmed to (i) detect the state of the at least one balancing member, and (ii) direct the braking member to control the resistance to motion based upon the state of the at least one balancing member. In some embodiments, the one or more computer processors may be individually or collectively programmed to direct the braking member to increase the resistance to motion so as to prevent an increase in a velocity of the self-balancing vehicle before the state of the at least one balancing member transitions from the operational state to a non-operational state. In some embodiments, the one or more computer processors may be individually or collectively programmed to direct the braking member to increase the resistance to motion so as to decrease a velocity of the self-balancing vehicle upon the state of the at least one balancing, member transitioning from the operational state to a non-operational state.

In some embodiments, the state of the at least one balancing member may be indicative of the balancing member being in an operational state, and wherein the one or more computer processors may be individually or collectively programmed to (i) detect the a degree of tilt or change thereof with respect to the gravitational acceleration vector, and (ii) direct the braking member to control the resistance to motion based upon the degree of tilt or change thereof of the vehicle body. In some embodiments, the one or more computer processors may be individually or collectively programmed to increase the resistance to motion when the degree of tilt or change thereof with respect to the gravitational acceleration vector reaches a predetermined orientation threshold. In some embodiments, the one or more computer processors may be individually or collectively programmed to direct the braking member to increase the resistance to motion so as to prevent an increase in a velocity of the self-balancing vehicle before the degree of tilt or change thereof with respect to the gravitational acceleration vector reaches the predetermined orientation threshold. In some embodiments, the predetermined orientation threshold is at least 30 degrees. In some embodiments, the one or more computer processors may be individually or collectively programmed to direct the braking member to increase the resistance to motion so as to decrease a velocity of the self-balancing vehicle upon the degree of tilt or change thereof with respect to the gravitational acceleration vector reaching the predetermined orientation threshold.

In some embodiments, the balancing member may include a control moment gyroscope (CMG). In some embodiments, the state of the at least one balancing member may include an operating state of the CMG that is determined based upon whether a gimbal angle of the CMG with respect to the vehicle body reaches a predetermined gimbal angle limit. In some embodiments, the limit may be ±45 degrees.

In some embodiments, the balancing member may include a flywheel. In some embodiments, the state of the at least one balancing member may include an operating state of the flywheel that is determined based upon whether a rate of rotation of the flywheel reaches a predetermined limit. In some embodiments, the limit may be at least 5000 rpm.

In some embodiments, the balancing member may include a shifting weight. In some embodiments, the shifting weight may be movable along a direction substantially perpendicular to the first axis of the vehicle body. In some embodiments, the state of the at least one balancing member may include an operating state of the shifting weight that is determined based upon whether a mass of the shifting weight reaches a sliding end.

In some embodiments, the self-balancing vehicle may further comprise a motor that provides translational motion to the vehicle body. In some embodiments, the motor may be an internal combustion engine. Alternatively, the motor may be an electric motor. In some embodiments, the motor may be operatively coupled to at least one of the at least two wheels. Alternatively, the motor may be operatively coupled to the at least two wheels. In some embodiments, the braking member may be coupled to the motor to regulate a rotating speed of the motor.

In some embodiments, the at least two wheels may be operatively coupled to one another. In some embodiments, at least one of the at least two wheels may be steerable. In some embodiments, the at least two wheels may be independently steerable. Alternatively, the at least two wheels may be concertedly steerable.

In some embodiments, the balancing member may provide self-balancing to the vehicle body while the vehicle body is moving with respect to the support surface. In some embodiments, the balancing member may provide self-balancing to the vehicle body while the vehicle body is stationary with respect to the support surface. Alternatively, the balancing member may not provide self-balancing to the vehicle body while the vehicle body is stationary with respect to the support surface. In some embodiments, the one or more computer processors may be individually or collectively programmed to direct the balancing member to provide self-balancing to the vehicle body when the vehicle body has transitioned from a stationary state to a moving state with respect to the support surface.

In some embodiments, the at least one balancing member may comprise a plurality of balancing members. In some embodiments, the plurality of balancing members may comprise a first balancing member adjacent to a second balancing member. In some embodiments, the first balancing member may be adjacent to the second balancing member along an axis that is orthogonal to the first axis. Alternatively, the first balancing member may be adjacent to the second balancing member along the first axis. In some embodiments, the first balancing member and second balancing member may include masses that rotate in opposite directions.

In some embodiments, the self-balancing vehicle may further comprise one or more sensors for detecting the degree of tilt of the vehicle body. In some embodiments, the one or more computer processors may be individually or collectively programmed to direct the braking member to modulate the resistance to motion based upon the operating state or change thereof of the vehicle. In some embodiments, the resistance to motion may be modulated at a frequency of at least about 2 Hz.

In some embodiments, the self-balancing vehicle may further comprise a steering member coupled to the at least one of the at least two wheels, wherein the steering member maybe movable to provide rotation of the at least one of the at least two wheels along a second axis that is angled with respect to the first axis, wherein a resistance to movement of the steering member may be controllable based upon the operating state or change thereof of the vehicle.

In another aspect of the present disclosure, a method for operating a self-balancing vehicle may comprise: (a) monitoring an operating state of the self-balancing vehicle adjacent to a support surface, wherein the self-balancing vehicle may comprise (i) a vehicle body having a first axis, (ii) at least two wheels aligned substantially along the first axis, wherein each of the at least two wheels may be configured to support the vehicle body against a support surface, and wherein at least one of the at least two wheels may be rotatable along a second axis that is angled with respect to the first axis, (iii) at least one balancing member disposed within the vehicle body, wherein the balancing member may facilitate self-balancing of the vehicle body against the support surface, and (iv) a steering member coupled to the at least one of the at least two wheels, wherein the steering member may be movable to provide rotation of the at least one of the at least two wheels along the second axis, wherein a resistance to movement of the steering member may be controllable based upon an operating state or change thereof of the vehicle, which operating state may be selected from the group consisting of a state of the at least one balancing member and a degree of tilt with respect to the gravitational acceleration vector; and (b) controlling the resistance to movement of the steering member based upon the operating state or change thereof of the vehicle.

In some embodiments, the steering member may be rotatable. In some embodiments, the steering member may be substantially circular. Alternatively, the steering member may include handles.

In some embodiments, the monitoring may comprise detecting the operating state or change thereof of the vehicle. In some embodiments, the state of the at least one balancing member may be an operational state, a faulty state or a non-operational state.

In some embodiments, the controlling may comprise directing the steering member to increase or decrease the resistance to movement. Alternatively, the controlling may comprise directing the steering member to maintain the resistance to movement.

In some embodiments, the state of the at least one balancing member may be indicative of the balancing member being in a faulty or non-operational state, and the controlling may comprise controlling the resistance to movement when the balancing member is in the faulty or non-operational state.

In some embodiments, the state of the at least one, balancing member may be indicative of the balancing member being in an operational state, and wherein the monitoring may comprise detecting the state of the at least one balancing, member, and wherein the controlling may comprise controlling the resistance to movement of the steering member based upon the state of the at least one balancing member. In some embodiments, the controlling may comprise increasing the resistance to movement of the steering member before the state of the at least one balancing member transitions from the operational state to a non-operational state. In some embodiments, the controlling may comprise prohibiting movement of the steering member upon the state of the at least one balancing member transitioning from the operational state to a non-operational state.

In some embodiments, the state of the at least one balancing member may be indicative of the balancing member being in an operational state, and wherein the monitoring may comprise detecting the degree of tilt or change thereof with respect to the gravitational acceleration vector, and wherein the controlling may comprise controlling the resistance to movement based upon the degree of tilt or change thereof. In some embodiments, the controlling may comprise increasing the resistance to movement of the steering member when the degree of tilt or change thereof with respect to the gravitational acceleration vector reaches a predetermined orientation threshold. In some embodiments, the predetermined orientation threshold may be at least 30 degrees. Alternatively, the controlling, may comprise increasing the resistance to movement of the steering member before the degree of tilt or change thereof with respect to the gravitational acceleration vector reaches the predetermined orientation threshold. In some embodiments, the controlling may comprise prohibiting movement of the steering member upon the degree of tilt or change thereof reaching the predetermined orientation threshold.

In some embodiments, the balancing member may include a control moment gyroscope (CMG). In some embodiments, the operating state of the CMG may be determined based upon whether a gimbal angle of the CMG with respect to the vehicle body reaches a predetermined gimbal angle limit. In some embodiments, the controlling may comprise increasing the resistance to movement of the steering member when the gimbal angle of the CMG reaches 80% of the predetermined gimbal angle limit. In some embodiments, the predetermined gimbal angle limit may be ±45 degrees.

In some embodiments, the balancing member may include a flywheel. In some embodiments, the operating state of the at least one balancing member may include an operating state of the flywheel that is determined based upon whether a rate of rotation of the flywheel reaches a predetermined limit. In some embodiments, the controlling may comprise increasing the resistance to movement of the steering member when the rate of rotation of the flywheel reaches 80% of the predetermined limit. In some embodiments, the limit may be at least 5000 rpm.

In some embodiments, the balancing member may include a shifting weight. In some embodiments, the shifting weight may be movable along a direction substantially perpendicular to the first axis of the vehicle body. In some embodiments, the operating state of the at least one balancing member may include an operating state of the shifting weight that is determined based upon whether a mass of the shifting weight reaches an end of a sliding rod along which the mass slides. In some embodiments, the controlling may comprise increasing the resistance to movement of the steering member when the mass of the shifting weight reaches 80% of a length of the sliding rod.

In some embodiments, the self-balancing vehicle may further comprise a motor that provides translational motion to the vehicle body. In some embodiments, the motor may be an internal combustion engine. Alternatively, the motor may be an electric motor. In some embodiments, the motor may be operatively coupled to at least one of the at least two wheels. Alternatively, the motor may be operatively coupled to the at least two wheels.

In some embodiments, the at least two wheels may be operatively coupled to one another. In some embodiments, both of the at least two wheels may be steerable. In some embodiments, the at least two wheels may be independently steerable. Alternatively, the at least two wheels may be concertedly steerable.

In some embodiments, the balancing member may provide self-balancing to the vehicle body while the vehicle body is moving with respect to the support surface. In some embodiments, the balancing member may provide self-balancing to the vehicle body while the vehicle body is stationary with respect to the support surface. Alternatively, the balancing member may not provide self-balancing to the vehicle body while the vehicle body is stationary with respect to the support surface. In some embodiments, the controlling may comprise directing the balancing member to provide self-balancing to the vehicle body when the vehicle body has transitioned from a stationary state to a moving state with respect to the support surface.

In some embodiments, the first axis may be a longitudinal axis. In some embodiments, the second axis may be angled with respect to the first axis at an angle greater than 0°. Alternatively, the angle may be greater than or equal to 25°. Alternatively, the angle may be greater than or equal to 45°. Alternatively, the second axis is substantially orthogonal to the first axis.

In some embodiments, the at least one balancing member may comprise a plurality of balancing members. In some embodiments, the plurality of balancing members may comprise a first balancing member adjacent to a second balancing member. In some embodiments, the first balancing member may be adjacent to the second balancing member along an axis that is orthogonal to the first axis. Alternatively, the first balancing member may be adjacent to the second balancing member along the first axis. In some embodiments, the first balancing member, and second balancing member include masses that rotate in opposite directions.

In some embodiments the self-balancing vehicle may further comprise one or more sensors for detecting the degree of tilt of the vehicle body. In some embodiments, the one or more sensors may include a gyroscope that detects the degree of tilt of the vehicle body with respect to the gravitational acceleration vector.

In some embodiments, the controlling may comprise directing the steering member to modulate the resistance to movement based upon the operating state or change thereof of the vehicle. In some embodiments, the resistance to movement may be modulated at a frequency of at least about 2 Hz.

In some embodiments, the self-balancing vehicle may further comprise at least one braking member coupled to at least one of the at least two wheels. In some embodiments, the at least one braking member may control a resistance to motion of the at least one of the at least two wheels against the support surface based upon the operating state or change thereof of the vehicle.

In some embodiments, the steering member may comprise a breaking unit that regulates the resistance to movement of the steering member.

In another aspect of the present disclosure, a method for operating a self-balancing vehicle may comprise: (a) monitoring an operating state of the self-balancing vehicle adjacent to a support surface, wherein the self-balancing vehicle may comprise (i) a vehicle body having a first axis, (ii) at least two wheels aligned substantially along the first axis, wherein each of the at least two wheels may be configured to support the vehicle body against a support surface, (iii) at least one balancing member disposed within the vehicle body, wherein the balancing member may facilitate self-balancing of the vehicle body against the support surface, and (iv) at least one braking member coupled to the at least one of the at least two wheels, wherein the at least one braking member may control a resistance to motion of the at least one of the at least two wheels against the support surface based upon an operating state or change thereof of the vehicle, which operating state may be selected from the group consisting of a state of the at least one balancing member and a degree of tilt with respect to the gravitational acceleration vector; and (b) controlling the resistance to motion based upon the operating state or change thereof of the vehicle.

In some embodiments, at least one of the at least two wheels may be rotatable along a second axis that is angled with respect to the first axis. In some embodiments, the first axis may be a longitudinal axis.

In some embodiments, the braking member may be coupled to the at least two wheels, and wherein the braking member may control a resistance to motion of the at least two wheels against the support surface based upon the operating state or change thereof of the vehicle. In some embodiments, the at least one braking member may comprise at least two braking members. In some embodiments, the at least one braking member may include a braking unit that is in contact with the at least one of the at least two wheels.

In some embodiments, the monitoring may comprise detecting the operating state or change thereof of the vehicle. In some embodiments, the state of the at least one balancing member may be an operational state, a faulty state or a non-operational state. In some embodiments, the controlling may comprise directing the at least one braking member to increase or decrease the resistance to motion. Alternatively, the controlling may comprise directing the at least one braking member to maintain the resistance to motion.

In some embodiments, the state of the at least one balancing member may be indicative of the balancing member being in a faulty or non-operational state, and wherein the controlling may comprise controlling the resistance to motion to stop the vehicle w ten the balancing member is in the faulty or non-operational state.

In some embodiments, the state of the at least one balancing member may be indicative of the balancing member being in an operational state, and wherein, the monitoring may comprise detecting the state of the at least one balancing member, and wherein the controlling may comprise directing the braking member to control the resistance to motion based upon the state of the at least one balancing member. In some embodiments, the controlling may comprise directing the braking member to increase the resistance to motion so as to prevent an increase in a velocity of the self-balancing vehicle before the state of the at least one balancing member transitions from the operational state to a non-operational state. In some embodiments, the controlling may comprise directing the braking member to increase the resistance to motion so as to decrease a velocity of the self-balancing vehicle upon the state of the at least one balancing member transitioning from the operational state to a non-operational state.

In some embodiments, the state of the at least one balancing member may be indicative of the balancing member being in an operational state, and wherein the monitoring may comprise detecting the a degree of tilt or change thereof with respect to the gravitational acceleration vector, and wherein the controlling may comprise directing the braking member to control the resistance to motion based upon the degree of tilt or change thereof of the vehicle body. In some embodiments, the controlling may comprise increasing the resistance to motion when the degree of tilt or change thereof with respect to the gravitational acceleration vector reaches a predetermined orientation threshold. In some embodiments, the predetermined orientation threshold may be at least 30 degrees. In some embodiments, the controlling may comprise directing the braking member to increase the resistance to motion so as to prevent an increase in a velocity of the self-balancing vehicle before the degree of tilt or change thereof with respect to the gravitational acceleration vector reaches the predetermined orientation threshold. In some embodiments, the controlling may comprise directing the braking member to increase the resistance to motion so as to decrease a velocity of the self-balancing vehicle upon the degree of tilt or change thereof with respect to the gravitational acceleration vector reaching the predetermined orientation threshold.

In some embodiments, the balancing member may include a control moment gyroscope (CMG). In some embodiments, the state of the at least one balancing member may include an operating state of the CMG that is determined based upon whether a gimbal angle of the CMG with respect to the vehicle body reaches a predetermined gimbal angle limit. In some embodiments, the limit may be ±45 degrees.

In some embodiments, the balancing member may include a flywheel. In some embodiments, the state of the at least one, balancing member, may include an operating state of the flywheel that is determined based upon whether a rate of rotation of the flywheel reaches a predetermined limit. In some embodiments, the limit may be at least 5000 rpm.

In some embodiments, the balancing member may include a shifting weight. In some embodiments, the shifting weight may be movable along a direction substantially perpendicular to the first axis of the vehicle body. In some embodiments, the state of the at least one balancing member may include an operating state of the shifting weight that is determined based upon whether a mass of the shifting weight reaches a sliding end.

In some embodiments, the self-balancing vehicle may further comprise a motor that provides translational motion to the vehicle body. In some embodiments, the motor may be an internal combustion engine. Alternatively, the motor may be an electric motor. In some embodiments, the motor may be operatively coupled to at least one of the at least two wheels. Alternatively, the motor may be operatively coupled to the at least two wheels. In some embodiments, the braking member may be coupled to the motor to regulate a rotating speed of the motor.

In some embodiments, the at least two wheels may be operatively coupled to one another. In some embodiments, at least one of the at least two wheels may be steerable. In some embodiments, the at least two wheels may be independently steerable. Alternatively, the at least two wheels may be concertedly steerable.

In some embodiments, the balancing member may provide self-balancing to the vehicle body while the vehicle body is moving with respect to the support surface. In some embodiments, the balancing member may provide self-balancing to the vehicle body while the vehicle body is stationary with respect to the support surface. Alternatively, the balancing member may not provide self-balancing to the vehicle body while the vehicle body is stationary with respect to the support surface. In some embodiments, the one or more computer processors may be individually or collectively programmed to direct the balancing member to provide self-balancing to the vehicle body when the vehicle body has transitioned from a stationary state to a moving state with respect to the support surface.

In some embodiments, the at least one balancing member may comprise a plurality of balancing members. In some embodiments, the plurality of balancing members may comprise a first balancing member adjacent to a second balancing member. In some embodiments, the first balancing member may be adjacent to the second balancing member along an axis that is orthogonal to the first axis. Alternatively, the first balancing member may be adjacent to the second balancing member along the first axis. In some embodiments, the first balancing member and second balancing member may include masses that rotate in opposite directions.

In some embodiments, the self-balancing vehicle may further comprise one or more sensors for detecting the degree of tilt of the vehicle body. In some embodiments, the controlling may comprise directing the braking member to modulate the resistance to motion based upon the operating state or change thereof of the vehicle. In some embodiments, the resistance to motion may be modulated at a frequency of at least about 2 Hz.

In some embodiments, the self-balancing vehicle may further comprise a steering member coupled to the at least one of the at least two wheels, wherein the steering member maybe movable to provide rotation of the at least one of the at least two wheels along a second axis that is angled with respect to the first axis, wherein a resistance to movement of the steering member may be controllable based upon the operating state or change thereof of the vehicle.

In another aspect of the present disclosure, a control system may comprise one or more computer processors that are individually or collectively programmed to implement a method for operating, a self-balancing vehicle, the method comprising: (a) monitoring an operating state of the self-balancing vehicle adjacent to a support surface, wherein the self-balancing vehicle may comprise (i) a vehicle body having a first axis, (ii) at least two wheels aligned substantially along the first axis, wherein each of the at least two wheels may be configured to support the vehicle body against a support surface, and wherein at least one of the at least two wheels may be rotatable along a second axis that is angled with respect to the first axis, (iii) at least one balancing member disposed within the vehicle body, wherein the balancing member may facilitate self-balancing of the vehicle body against the support surface, and (iv) a steering member coupled to the at least one of the at least two wheels, wherein the steering member may be movable to provide rotation of the at least one of the at least two wheels along the second axis, wherein a resistance to movement of the steering member may be controllable based upon an operating state or change thereof of the vehicle, which operating state may be selected from the group consisting of a state of the at least one balancing member and a degree of tilt with respect to the gravitational acceleration vector; and (b) controlling the resistance to movement of the steering member based upon the operating state or change thereof of the vehicle.

In some embodiments, the steering member may be rotatable. In some embodiments, the steering member may be substantially circular. Alternatively, the steering member may include handles.

In some embodiments, the monitoring may comprise detecting the operating state or change thereof of the vehicle. In some embodiments, the state of the at least one balancing member may be an operational state, a faulty state or a non-operational state.

In some embodiments, the controlling may comprise directing the steering member to increase, or decrease the resistance to movement. Alternatively, the controlling may comprise directing the steering member to maintain the resistance to movement.

In some embodiments, the state of the at least one balancing member may be indicative of the balancing member being in a faulty or non-operational state, and the controlling may comprise controlling the resistance to movement when the balancing member is in the faulty or non-operational state.

In some embodiments, the state of the at least one balancing member may be indicative of the balancing member being in an operational state, and wherein the monitoring may comprise detecting the state of the at least one balancing, member, and wherein the controlling may comprise controlling the resistance to movement of the steering member based upon the state of the at least one balancing member. In some embodiments, the controlling may comprise increasing the resistance to movement of the steering member before the state of the at least one balancing member transitions from the operational state to a non-operational state. In some embodiments, the controlling may comprise prohibiting movement of the steering member upon the state of the at least one balancing member transitioning from the operational state to a non-operational state.

In some embodiments, the state of the at least one balancing member may be indicative of the balancing member being in an operational state, and wherein the monitoring may comprise detecting the degree of tilt or change thereof with respect to the gravitational acceleration vector, and wherein the controlling may comprise controlling the resistance to movement based upon the degree of tilt or change thereof. In some embodiments, the controlling may comprise increasing the resistance to movement of the steering member when the degree of tilt or change thereof with respect to the gravitational acceleration vector reaches a predetermined orientation threshold. In some embodiments, the predetermined orientation threshold may be at least 30 degrees. Alternatively, the controlling, may comprise increasing the resistance to movement of the steering member before the degree of tilt or change thereof with respect to the gravitational acceleration vector reaches the predetermined orientation threshold. In some embodiments, the controlling may comprise prohibiting movement of the steering member upon the degree of tilt or change thereof reaching the predetermined orientation threshold.

In some embodiments, the balancing member may include a control moment gyroscope (CMG). In some embodiments, the operating state of the CMG may be determined based upon whether a gimbal angle of the CMG with respect to the vehicle body reaches a predetermined gimbal angle limit. In some embodiments, the controlling may comprise increasing the resistance to movement of the steering member when the gimbal angle of the CMG reaches 80% of the predetermined gimbal angle limit. In some embodiments, the predetermined gimbal angle limit may be ±45 degrees.

In some embodiments, the balancing member may include a flywheel. In some embodiments, the operating state of the at least one balancing member may include an operating state of the flywheel that is determined based upon whether a rate of rotation of the flywheel reaches a predetermined limit. In some embodiments, the controlling may comprise increasing the resistance to movement of the steering member when the rate of rotation of the flywheel reaches 80% of the predetermined limit. In some embodiments, the limit may be at least 5000 rpm.

In some embodiments, the balancing member may include a shifting weight. In some embodiments, the shifting weight may be movable along a direction substantially perpendicular to the first axis of the vehicle body. In some embodiments, the operating state of the at least one balancing member may include an operating state of the shifting weight that is determined based upon whether a mass of the shifting weight reaches an end of a sliding rod along which the mass slides. In some embodiments, the controlling may comprise increasing the resistance to movement of the steering member when the mass of the shifting weight reaches 80% of a length of the sliding rod.

In some embodiments, the self-balancing vehicle may further comprise a motor that provides translational motion to the vehicle body. In some embodiments, the motor may be an internal combustion engine. Alternatively, the motor may be an electric motor. In some embodiments, the motor may be operatively coupled to at least one of the at least two wheels. Alternatively, the motor may be operatively coupled to the at least two wheels.

In some embodiments, the at least two wheels may be operatively coupled to one another. In some embodiments, both of the at least two wheels may be steerable. In some embodiments, the at least two wheels may be independently steerable. Alternatively, the at least two wheels may be concertedly steerable.

In some embodiments, the balancing member may provide self-balancing to the vehicle body while the vehicle body is moving with respect to the support surface. In some embodiments, the balancing member may provide self-balancing to the vehicle body while the vehicle body is stationary with respect to the support surface. Alternatively, the balancing member may not provide self-balancing to the vehicle body while the vehicle body is stationary with respect to the support surface. In some embodiments, the controlling may comprise directing the balancing member to provide self-balancing to the vehicle body when the vehicle body has transitioned from a stationary state to a moving state with respect to the support surface.

In some embodiments, the first axis may be a longitudinal axis. In some embodiments, the second axis may be angled with respect to the first axis at an angle greater than 0°. Alternatively, the angle may be greater than or equal to 25°. Alternatively, the angle may be greater than or equal to 45°. Alternatively, the second axis is substantially orthogonal to the first axis.

In some embodiments, the at least one balancing member may comprise a plurality of balancing members. In some embodiments, the plurality of balancing members may comprise a first balancing member adjacent to a second balancing member. In some embodiments, the first balancing member may be adjacent to the second balancing member along an axis that is orthogonal to the first axis. Alternatively, the first balancing member may be adjacent to the second balancing member along the first axis. In some embodiments, the first balancing member and second balancing member include masses that rotate in opposite directions.

In some embodiments the self-balancing vehicle may further comprise one or more sensors for detecting the degree of tilt of the vehicle body. In some embodiments, the one or more sensors may include a gyroscope that detects the degree of tilt of the vehicle body with respect to the gravitational acceleration vector.

In some embodiments, the controlling may comprise directing the steering member to modulate the resistance to movement based upon the operating state or change thereof of the vehicle. In some embodiments, the resistance to movement may be modulated at a frequency of at least about 2 Hz.

In some embodiments, the self-balancing vehicle may further comprise at least one braking member coupled to at least one of the at least two wheels. In some embodiments, the at least one braking member may control a resistance to motion of the at least one of the at least two wheels against the support surface based upon the operating state or change thereof of the vehicle.

In some embodiments, the steering member may comprise a breaking unit that regulates the resistance to movement of the steering member.

In another aspect of the present disclosure, a control system may comprise one or more computer processors that are individually or collectively programmed to implement a method for operating a self-balancing vehicle, the method comprising: (a) monitoring an operating state of the self-balancing vehicle adjacent to a support surface, wherein the self-balancing vehicle may comprise (i) a vehicle body having a first axis, (ii) at least two wheels aligned substantially along the first axis, wherein each of the at least two wheels may be configured to support the vehicle body against a support surface, (iii) at least one balancing member disposed within the vehicle body, wherein the balancing member may facilitate self-balancing of the vehicle body against the support surface, and (iv) at least one braking member coupled to the at least one of the at least two wheels, wherein the at least one braking member may control a resistance to motion of the at least one of the at least two wheels against the support surface based upon an operating state or change thereof of the vehicle, which operating state may be selected from the group consisting of a state of the at least one balancing member and a degree of tilt with respect to the gravitational acceleration vector; and (b) controlling the resistance to motion based upon the operating state or change thereof of the vehicle.

In some embodiments, at least one of the at least two wheels may be rotatable along a second axis that is angled with respect to the first axis. In some embodiments, the first axis may be a longitudinal axis.

In some embodiments, the braking member may be coupled to the at least two wheels, and wherein the braking member may control a resistance to motion of the at least two wheels against the support surface based upon the operating state or change thereof of the vehicle. In some embodiments, the at least one braking member may comprise at least two braking members. In some embodiments, the at least one braking member may include a braking unit that is in contact with the at least one of the at least two wheels.

In some embodiments, the monitoring may comprise detecting the operating state or change thereof of the vehicle. In some embodiments, the state of the at least one balancing member may be an operational state, a faulty state or a non-operational state. In some embodiments, the controlling may comprise directing the at least one braking member to increase or decrease the resistance to motion. Alternatively, the controlling may comprise directing the at least one braking member to maintain the resistance to motion.

In some embodiments, the state of the at least one balancing member may be indicative of the balancing member being in a faulty or non-operational state, and wherein the controlling may comprise controlling the resistance to motion to stop the vehicle when the balancing member is in the faulty or non-operational state.

In some embodiments, the state of the at least one balancing member may be indicative of the balancing, member being in an operational state, and wherein the monitoring may comprise detecting the state of the at least one balancing member, and wherein the controlling may comprise directing the braking member to control the resistance to motion based upon the state of the at least one balancing member. In some embodiments, the controlling may comprise directing the braking member to increase the resistance to motion so as to prevent an increase in a velocity of the self-balancing vehicle before the state of the at least one balancing member transitions from the operational state to a non-operational state. In some embodiments, the controlling may comprise directing the braking member to increase the resistance to motion so as to decrease a velocity of the self-balancing vehicle upon the state of the at least one balancing member transitioning from the operational state to a non-operational state.

In some embodiments, the state of the at least one balancing member may be indicative of the balancing member being in an operational state, and wherein the monitoring may comprise detecting the a degree of tilt or change thereof with respect to the gravitational acceleration vector, and wherein the controlling may comprise directing the braking member to control the resistance to motion based upon the degree of tilt or change thereof of the vehicle body. In some embodiments, the controlling may comprise increasing the resistance to motion when the degree of tilt or change thereof with respect to the gravitational acceleration vector reaches a predetermined orientation threshold. In some embodiments, the predetermined orientation threshold may be at least 30 degrees. In some embodiments, the controlling may comprise directing the braking member to increase the resistance to motion so as to prevent an increase in a velocity of the self-balancing vehicle before the degree of tilt or change thereof with respect to the gravitational acceleration vector reaches the predetermined orientation threshold. In some embodiments, the controlling may comprise directing the braking member to increase the resistance to motion so as to decrease a velocity of the self-balancing vehicle upon the degree of tilt or change thereof with respect to the gravitational acceleration vector reaching the predetermined orientation threshold.

In some embodiments, the balancing member may include a control moment gyroscope (CMG). In some embodiments, the state of the at least one balancing member may include an operating state of the CMG that is determined based upon whether a gimbal angle of the CMG with respect to the vehicle body reaches a predetermined gimbal angle limit. In some embodiments, the limit may be ±45 degrees.

In some embodiments, the balancing member may include a flywheel. In some embodiments, the state of the at least one balancing member may include an operating state of the flywheel that is determined based upon whether a rate of rotation of the flywheel reaches a predetermined limit. In some embodiments, the limit may be at least 5000 rpm.

In some embodiments, the balancing member may include a shifting weight. In some embodiments, the shifting weight may be movable along a direction substantially perpendicular to the first axis of the vehicle body. In some embodiments, the state of the at least one balancing member may include an operating state of the shifting weight that is determined based upon whether a mass of the shifting weight reaches a sliding end.

In some embodiments, the self-balancing vehicle may further comprise a motor that provides translational motion to the vehicle body. In some embodiments, the motor may be an internal combustion engine. Alternatively, the motor may be an electric motor. In some embodiments, the motor may be operatively coupled to at least one of the at least two wheels. Alternatively, the motor may be operatively coupled to the at least two wheels. In some embodiments, the braking member may be coupled to the motor to regulate a rotating speed of the motor.

In some embodiments, the at least two wheels may be operatively coupled to one another. In some embodiments, at least one of the at least two wheels may be steerable. In some embodiments, the at least two wheels may be independently steerable. Alternatively, the at least two wheels may be concertedly steerable.

In some embodiments, the balancing member may provide self-balancing to the vehicle body while the vehicle body is moving with respect to the support surface. In some embodiments, the balancing member may provide self-balancing to the vehicle body while the vehicle body is stationary with respect to the support surface. Alternatively, the balancing member may not provide self-balancing to the vehicle body while the vehicle body is stationary with respect to the support surface. In some embodiments, the one or more computer processors may be individually or collectively programmed to direct the balancing member to provide self-balancing to the vehicle body when the vehicle body has transitioned from a stationary state to a moving state with respect to the support surface.

In some embodiments, the at least one balancing member may comprise a plurality of balancing members. In some embodiments, the plurality of balancing members may comprise a first balancing member adjacent to a second balancing member. In some embodiments, the first balancing member may be adjacent to the second balancing member along an axis that is orthogonal to the first axis. Alternatively, the first balancing member may be adjacent to the second balancing member along the first axis. In some embodiments, the first balancing member and second balancing member may include masses that rotate in opposite directions.

In some embodiments, the self-balancing vehicle may further comprise one or more sensors for detecting the degree of tilt of the vehicle body. In some embodiments, the controlling may comprise directing the braking member to modulate the resistance to motion based upon the operating state or change thereof of the vehicle. In some embodiments, the resistance to motion may be modulated at a frequency of at least about 2 Hz.

In some embodiments, the self-balancing vehicle may further comprise a steering member coupled to the at least one of the at least two wheels, wherein the steering member maybe movable to provide rotation of the at least one of the at least, two wheels along a second axis that is angled with respect to the first axis, wherein a resistance to movement of the steering member may be controllable based upon the operating state or change thereof of the vehicle.

In another aspect of the present disclosure, a non-transitory computer readable medium may comprise machine executable code that, upon execution by one or more computer processors, implements a method for operation a self-balancing vehicle, the method comprising: (a) monitoring an operating state of the self-balancing vehicle adjacent to a support surface, wherein the self-balancing vehicle may comprise (i) a vehicle body having a first axis, (ii) at least two wheels aligned substantially along the first axis, wherein each of the at least two wheels may be configured to support the vehicle body against a support surface, and wherein at least one of the at least two wheels may be rotatable along a second axis that is angled with respect to the first axis, (iii) at least one balancing member disposed within the vehicle body, wherein the balancing member may facilitate self-balancing of the vehicle body against the support surface, and (iv) a steering member coupled to the at least one of the at least two wheels, wherein the steering, member may be movable to provide rotation of the at least one of the at least two wheels along the second axis, wherein a resistance to movement of the steering member may be controllable based upon an operating state or change thereof of the vehicle, which operating state may be selected from the group consisting of a state of the at least one balancing member and a degree of tilt with respect to the gravitational acceleration vector; and (b) controlling the resistance to movement of the steering member based upon the operating state or change thereof of the vehicle.

In some embodiments, the steering member may be rotatable. In some embodiments, the steering member may be substantially circular. Alternatively, the steering member may include handles.

In some embodiments, the monitoring may comprise detecting the operating state or change thereof of the vehicle. In some embodiments, the state of the at least one balancing member may be an operational state, a faulty state or a non-operational state.

In some embodiments, the controlling may comprise directing the steering member to increase or decrease the resistance to movement. Alternatively the controlling may comprise directing the steering member to maintain the resistance to movement.

In some embodiments, the state of the at least one balancing member may be indicative of the balancing member being in a faulty or non-operational state, and the controlling may comprise controlling the resistance to movement when the balancing member is in the faulty or non-operational state.

In some embodiments, the state of the at least one balancing member may be indicative of the balancing member being in an operational state, and wherein the monitoring may comprise detecting the state of the at least one balancing member, and wherein the controlling may comprise controlling the resistance to movement of the steering member based upon the state of the at least one balancing member. In some embodiments, the controlling may comprise increasing the resistance to movement of the steering member before the state of the at least one balancing member transitions from the operational state to a non-operational state. In some embodiments, the controlling may comprise prohibiting movement of the steering member upon the state of the at least one balancing member transitioning from the operational state to a non-operational state.

In some embodiments, the state of the at least one balancing member may be indicative of the balancing member being in an operational state, and wherein the monitoring may comprise detecting the degree of tilt or change thereof with respect to the gravitational acceleration vector, and wherein the controlling may comprise controlling the resistance to movement based upon the degree of tilt or change thereof. In some embodiments, the controlling may comprise increasing the resistance to movement of the steering member when the degree of tilt or change thereof with respect to the gravitational acceleration vector reaches a predetermined orientation threshold. In some embodiments, the predetermined orientation threshold may be at least 30 degrees. Alternatively, the controlling, may comprise increasing the resistance to movement of the steering member before the degree of tilt or change thereof with respect to the gravitational acceleration vector reaches the predetermined orientation threshold. In some embodiments, the controlling may comprise prohibiting movement of the steering member upon the degree of tilt or change thereof reaching the predetermined orientation threshold.

In some embodiments, the balancing member may include a control moment gyroscope (CMG). In some embodiments, the operating state of the CMG may be determined based upon whether a gimbal angle of the CMG with respect to the vehicle body reaches a predetermined gimbal angle limit. In some embodiments, the controlling may comprise increasing the resistance to movement of the steering member when the gimbal angle of the CMG reaches 80% of the predetermined gimbal angle limit. In some embodiments, the predetermined gimbal angle limit may be ±45 degrees.

In some embodiments, the balancing member may include a flywheel. In some embodiments, the operating state of the at least one balancing member may include an operating state of the flywheel that is determined based upon whether a rate of rotation of the flywheel reaches a predetermined limit. In some embodiments, the controlling may comprise increasing the resistance to movement of the steering member when the rate of rotation of the flywheel reaches 80% of the predetermined limit. In some embodiments, the limit may be at least 5000 rpm.

In some embodiments, the balancing member may include a shifting weight. In some embodiments, the shifting weight may be movable along a direction substantially perpendicular to the first axis of the vehicle body. In some embodiments, the operating state of the at least one balancing member may include an operating state of the shifting weight that is determined based upon whether a mass of the shifting weight reaches an end of a sliding rod along which the mass slides. In some embodiments, the controlling may comprise increasing the resistance to movement of the steering member when the mass of the shifting weight reaches 80% of a length of the sliding rod.

In some embodiments, the self-balancing vehicle may further comprise a motor that provides translational motion to the vehicle body. In some embodiments, the motor may be an internal combustion engine. Alternatively, the motor may be an electric motor. In some embodiments, the motor may be operatively coupled to at least one of the at least two wheels. Alternatively, the motor may be operatively coupled to the at least two wheels.

In some embodiments, the at least two wheels may be operatively coupled to one another. In some embodiments, both of the at least two wheels may be steerable. In some embodiments the at least two wheels may be independently steerable. Alternatively, the at least two wheels may be concertedly steerable.

In some embodiments, the balancing member may provide self-balancing to the vehicle body while the vehicle, body is moving with respect to the support surface. In some embodiments, the balancing member may provide self-balancing to the vehicle body while the vehicle body is stationary with respect to the support surface. Alternatively, the balancing member may not provide self-balancing to the vehicle body while the vehicle body is stationary with respect to the support surface. In some embodiments, the controlling may comprise directing the balancing member to provide self-balancing to the vehicle body when the vehicle body has transitioned from a stationary state to a moving state with respect to the support surface.

In some embodiments, the first axis may be a longitudinal axis. In some embodiments, the second axis may be angled with respect to the first axis at an angle greater than 0°. Alternatively, the angle may be greater than or equal to 25°. Alternatively, the angle may be greater than or equal to 45°. Alternatively, the second axis is substantially orthogonal to the first axis.

In some embodiments, the at least one balancing member may comprise a plurality of balancing members. In some embodiments, the plurality of balancing members may comprise a first balancing member adjacent to a second balancing member. In some embodiments, the first balancing member may be adjacent to the second balancing member along an axis that is orthogonal to the first axis. Alternatively, the first balancing member may be adjacent to the second balancing member along the first axis. In some embodiments, the first balancing member and second balancing member include masses that rotate in opposite directions.

In some embodiments, the self-balancing vehicle may further comprise one or more sensors for detecting the degree of tilt of the vehicle body. In some embodiments, the one or more sensors may include a gyroscope that detects the degree of tilt of the vehicle body with respect to the gravitational acceleration vector.

In some embodiments, the controlling may comprise directing the steering member to modulate the resistance to movement based upon the operating state or change thereof of the vehicle. In some embodiments, the resistance to movement may be modulated at a frequency of at least about 2 Hz.

In some embodiments, the self-balancing vehicle may further comprise at least one braking member coupled to at least one of the at least two wheels. In some embodiments, the at least one braking member may control a resistance to motion of the at least one of the at least two wheels against the support surface based upon the operating state or change thereof of the vehicle.

In some embodiments, the steering member may comprise a breaking unit that regulates the resistance to, movement of the steering member.

In another aspect of the present disclosure, a non-transitory computer readable medium may comprise machine executable code that, upon execution by one or more computer processors, implements a method for operating a self-balancing vehicle, the method comprising: (a) monitoring an operating state of the self-balancing vehicle adjacent to a support surface, wherein the self-balancing vehicle may comprise (i) a vehicle body having a first axis, (ii) at least two wheels aligned substantially along the first axis, wherein each of the at least two wheels may be configured to support the vehicle body against a support surface, (iii) at least one balancing member disposed within the vehicle body, wherein the balancing member may facilitate self-balancing of the vehicle body against the support surface, and (iv) at least one braking member coupled to the at least one of the at least two wheels, wherein the at least one braking member may control a resistance to motion of the at least one of the at least two wheels against the support surface based upon an operating state or change thereof of the vehicle, which operating state may be selected from the group consisting of a state of the at least one balancing member and a degree of tilt with respect to the gravitational acceleration vector; and (b) controlling the resistance to motion based upon the operating state or change thereof of the vehicle.

In some embodiments, at least one of the at least two wheels may be rotatable along a second axis that is angled with respect to the first axis. In some embodiments, the first axis may be a longitudinal axis.

In some embodiments, the braking member may be coupled to the at least two wheels, and wherein the braking member may control a resistance to motion of the at least two wheels against the support surface based upon the operating state or change thereof of the vehicle. In some embodiments, the at least one braking member may comprise at least two braking members. In some embodiments, the at least one braking member may include a braking unit that is in contact with the at least one of the at least two wheels.

In some embodiments, the monitoring may comprise detecting the operating state or change thereof of the vehicle. In some embodiments, the state of the at least one balancing member may be an operational state, a faulty state or a non-operational state. In some embodiments, the controlling may comprise directing, the at least one braking member to increase or decrease the resistance to motion. Alternatively, the controlling may comprise directing the at least one braking member to maintain the resistance to motion.

In some embodiments, the state of the at least one balancing member may be indicative of the balancing member being in a faulty or non-operational state, and wherein the controlling may comprise controlling the resistance to motion to stop the vehicle when the balancing member is in the faulty or non-operational state.

In some embodiments, the state of the at least one balancing member may be indicative of the balancing member being in an operational state, and wherein the monitoring may comprise detecting the state of the at least one balancing member, and wherein the controlling may comprise directing the braking member to control the resistance to motion based upon the state of the at least one balancing member. In some embodiments, the controlling may comprise directing the braking member to increase the resistance to motion so as to prevent an increase in a velocity of the self-balancing vehicle before the state of the at least one balancing member transitions from the operational state to a non-operational state. In some embodiments, the controlling may comprise directing the braking member to increase the resistance to motion so as to decrease a velocity of the self-balancing vehicle upon the state of the at least one balancing member transitioning from the operational state to a non-operational state.

In some embodiments, the state of the at least one balancing member may be indicative of the balancing member being in an operational state, and wherein the monitoring may comprise detecting the a degree of tilt or change thereof with respect to the gravitational acceleration vector, and wherein the controlling may comprise directing the braking member to control the resistance to motion based upon the degree of tilt or change thereof of the vehicle body. In some embodiments, the controlling may comprise increasing the resistance to motion when the degree of tilt or change thereof with respect to the gravitational acceleration vector reaches a predetermined orientation threshold. In some embodiments, the predetermined orientation threshold may be at least 30 degrees. In some embodiments, the controlling may comprise directing the braking member to increase the resistance to motion so as to prevent an increase in a velocity of the self-balancing vehicle before the degree of tilt or change thereof with respect to the gravitational acceleration vector reaches the predetermined orientation threshold. In some embodiments, the controlling may comprise directing the braking member to increase the resistance to motion so as to decrease a velocity of the self-balancing vehicle upon the degree of tilt or change thereof with respect to the gravitational acceleration vector reaching the predetermined orientation threshold.

In some embodiments, the balancing member may include a control moment gyroscope (CMG). In some embodiments, the state of the at least one balancing member may include an operating state of the CMG that is determined based upon whether a gimbal angle of the CMG with respect to the vehicle body reaches a predetermined gimbal angle limit. In some embodiments, the limit may be ±45 degrees.

In some embodiments, the balancing member may include a flywheel. In some embodiments, the state of the at least one balancing member may include an operating state of the flywheel that is determined based upon whether a rate of rotation of the flywheel reaches a predetermined limit. In some embodiments, the limit may be at least 5000 rpm.

In some embodiments, the balancing member may include a shifting weight. In some embodiments, the shifting weight may be movable along a direction substantially perpendicular to the first axis of the vehicle body. In some embodiments, the state of the at least one balancing member may include an operating state of the shifting weight that is determined based upon whether a mass of the shifting weight reaches a sliding end.

In some embodiments, the self-balancing vehicle may further comprise a motor that provides translational motion to the vehicle body. In some embodiments, the motor may be an internal combustion engine. Alternatively, the motor may be an electric motor. In some embodiments, the motor may be operatively coupled to at least one of the at least two wheels. Alternatively, the motor may be operatively coupled to the at least two wheels. In some embodiments, the braking member may be coupled to, the motor to regulate a rotating speed of the motor.

In some embodiments the at least two wheels may be operatively coupled to one another. In some embodiments, at least one of the at least two wheels may be steerable. In some embodiments, the at least two wheels may be independently steerable. Alternatively, the at least two wheels may be concertedly steerable.

In some embodiments, the balancing member may provide self-balancing to the vehicle body while the vehicle body is moving with respect to the support surface. In some embodiments, the balancing member may provide self-balancing to the vehicle body while the vehicle body is stationary with respect to the support surface. Alternatively, the balancing member may not provide self-balancing to the vehicle body while the vehicle body is stationary with respect to the support surface. In some embodiments, the one or more computer processors may be individually or collectively programmed to direct the balancing member to provide self-balancing to the vehicle body when the vehicle body has transitioned from a stationary state to a moving state with respect to the support surface.

In some embodiments, the at least one balancing member may comprise a plurality of balancing members. In some embodiments, the plurality of balancing members may comprise a first balancing member adjacent to a second balancing member. In some embodiments, the first balancing member may be adjacent to the second balancing member along an axis that is orthogonal to the first axis. Alternatively, the first balancing member may be adjacent to the second balancing member along the first axis. In some embodiments, the first balancing member and second balancing member may include masses that rotate in opposite directions.

In some embodiments, the self-balancing vehicle may further comprise one or more sensors for detecting the degree of tilt of the vehicle body. In some embodiments, the controlling may comprise directing the braking member to modulate the resistance to motion based upon the operating state or change thereof of the vehicle. In some embodiments, the resistance to motion may be modulated at a frequency of at least about 2 Hz.

In some embodiments, the self-balancing vehicle may further comprise a steering member coupled to the at least one of the at least two wheels, wherein the steering member maybe movable to provide rotation of the at least one of the at least two wheels along a second axis that is angled with respect to the first axis, wherein a resistance to movement of the steering member may be controllable based upon the operating state or change thereof of the vehicle.

It shall be understood that different aspects of the invention can be appreciated individually, collectively, or in combination with each other. Various aspects of the invention described herein may be applied to any of the particular applications set forth below or for any other types of movable objects. Any description herein of two-wheeled vehicles may apply to and be used for vehicle having one wheel, three wheels, four wheels or even more wheels. For instance, any description herein of two-wheeled vehicles may apply to and be used for vehicle having a narrow track width.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
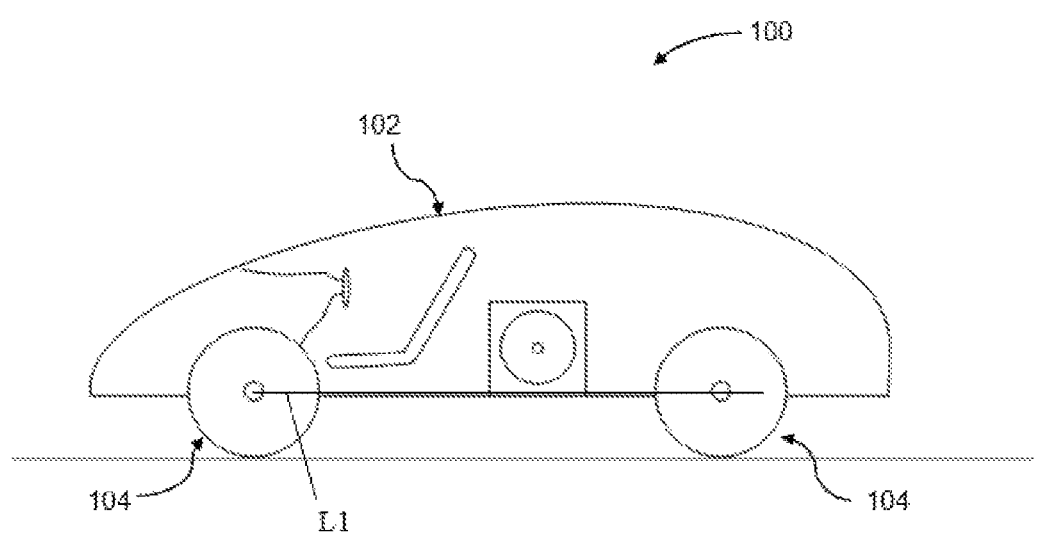
FIG. 1 schematically illustrates an example of a two-wheeled self-balancing vehicle having a control moment gyroscope (CMG) as the balancing member, in accordance with some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "vehicle," as used herein, generally refers to any machine that is capable of transporting objects from one point to another. A vehicle may be used in various settings, such as commercial, personal or recreational settings. The vehicle can include a form of locomotion, such as an engine (e.g., internal combustion, compressed gas, or electric motor), which may allow displacement or translation of the vehicle from one point to another. The form of locomotion may include a power source to provide the required kinetic energy, in addition to features that enable the vehicle to control motion, such as a braking and steering system. Examples of vehicles include two, three and four-wheeled vehicles.

The term "self-balancing," as used herein, generally refers to balancing with little, minimum or no effort by a user of a vehicle. A self-balancing vehicle can maintain its balance with respect to a support surface with little, minimum or no effort by the user. The self-balancing of self-balancing vehicle may be provided by various balancing members. For instance, the balancing member may comprise a control moment gyroscope (CMG), a flywheel, a shifting weight or any combination thereof. In some examples, the balancing member may provide self-balancing to vehicle body of the vehicle while the vehicle body is moving with respect to a support, surface. In other examples, the balancing member may provide self-balancing to the vehicle body while the vehicle body is stationary with respect to the support surface. In still other examples, the balancing member may not provide self-balancing to the vehicle body while the vehicle body is stationary with respect to the support surface. In some embodiments, the balancing member may provide self-balancing to the vehicle body while the vehicle is in a parking state or temporary stopping state. Alternatively, the balancing member may not provide self-balancing to the vehicle body while the vehicle is in a parking state or temporary stopping state to reduce power consumption. In this circumstance, auxiliary supporting members such as extendable side supporting legs may provide stability to the vehicle body. In still other examples, the balancing member may provide self-balancing to the vehicle body when the vehicle body has transitioned from a stationary state to a moving state with respect to the support surface.

The present disclosure provides systems and methods that can provide an effective approach for providing steering feedback and auxiliary braking to vehicles, such as self-balancing vehicles (e.g., two-wheeled vehicles). In some examples, the steering feedback is provided using a steering member of which a resistance to movement is controllable based on an operating state or a change thereof of the vehicle, for example, an operating state of the balancing member of the vehicle. When the balancing member is reaching a limit of providing stability (e.g., when the vehicle is steering a sharp angle with a high speed), the resistance to movement of the steering member may be increase such that a feedback is provided to the driver of the vehicle to inform the driver an operating state of the balancing member. Upon the balancing member reaches the limit of providing stability, the movement of the steering member may be prohibited to avoid a fall or flip over of the vehicle.

The present disclosure also provides systems and methods that can provide an effective approach for providing auxiliary braking to vehicles, such as self-balancing vehicles (e.g., two-wheeled vehicles). In some examples, the auxiliary braking is provided using at least one braking member which controls a resistance to motion based on an operating state or a change thereof of the vehicle, for example, an operating state of the balancing member of the vehicle. When, the balancing member is reaching a limit of providing, stability (e.g., when the vehicle is steering a sharp angle with a high speed), the braking member may increase a resistance to motion of the wheels of the vehicle so as to prevent an increase in a velocity of the vehicle. Upon the balancing member reaches the limit of providing stability, the braking member may further increase the resistance to motion of the wheels so as to decrease the velocity of the vehicle. In some instances, the steering member and the at least one braking, member may be used in combination.

Advantageously, the systems and methods disclosed herein can provide a steering feedback and auxiliary braking to self-balancing two-wheeled vehicles, to restrict a driver's operation and/or provide auxiliary and automatic braking when a risk of a turn or flip-over is detected, thereby improving safety of two-wheeled vehicles.

FIG. 1 schematically illustrates an example of a two-wheeled self-balancing vehicle 100 having a control moment gyroscope (CMG) as the balancing member. The two-wheeled self-balancing vehicle 100 may include a vehicle body 102 having a first axis (e.g., a longitudinal axis), two wheels 104 which are aligned substantially along the longitudinal axis, each of the at least two wheels being configured to support, the vehicle body against a support surface (e.g., round on which the vehicle moves on) and being rotatable along a second axis that is angled with respect to the first axis, and a CBM 106 provided on the vehicle. The second axis may be angled with respect to the first axis at an angle greater than 0°. In some examples, the angle between the second axis and the first axis may be greater than or equal to 25°. In other examples, the angle between the second axis and the first axis may be greater than or equal to 45°. In still other, examples, the second axis may be substantially orthogonal to the first axis.

The vehicle 100 may comprise a motor that provides translational motion to the vehicle body. The motor may be an internal combustion engine or an electric motor. The motor may be operatively coupled to at least one of the at least two wheels of the vehicle, for example to a rear wheel or a front wheel. In some instances, the motor may be operatively coupled to both the at least two wheels. In some examples, the at least two wheels may be operatively coupled to one another. In other examples, the at least two wheels may not be operatively coupled to one another. In some examples, both of the at least two wheels may be steerable, such that the vehicle may be flexible in parking. For instance, the at least two wheels may independently steerable or concertedly steerable.

The gyroscope can be used in engineering design due to two properties: rigidity and precession. Rigidity can be an important characteristic of gyroscopes where a spinning gyroscope will maintain its orientation in space. This property is utilized in at least some sensor applications, such as navigation systems and passive stabilization systems used in torpedoes or ships. The gyroscope can also be used as an actuator by utilizing, the precession phenomenon. CMG systems may use conservation of angular momentum to stabilize unstable bodies (e.g., vehicle bodies) by functioning as an actuator using the phenomenon of gyroscopic precession. When a flywheel is spinning about the ω axis, if an external disturbance is applied about the θ axis (e.g. a bump in the road) and if it has sufficient angular momentum, it will stay horizontal and begin to spin around the α axis (the ω axis, θ axis and α axis being orthogonal to one another). This spin about α axis can be called precession.

In some embodiments, the CMG 106 may include a flywheel, a gimbal frame, a motor and a gimbaling mechanism. The rotating velocity of the flywheel may be constant. Stability about a longitudinal axis (e.g., the roll axis of the vehicle) of the vehicle body may be achieved and adjusted from the rotating flywheel by adjusting a tilting angle of the gimbal frame with respect to the vehicle floor about the gimbal axis. The flywheel of the CMG may spin about a first axis with the aid of a spinning motor. The spinning flywheel may generate a large and constant angular momentum. The direction of the angular momentum vector can be changed by rotating the flywheel in a about a second axis (e.g., a gimbal axis) by a gimbal motor. A gyroscopic precession torque can be produced about a third axis (e.g., roll axis of the vehicle), which orthogonal to both the first and second axes. The direction of the gyroscopic precession torque may be determined on gimbal motion.

In some embodiments, the CMG 106 in a single-axis gimbal frame may be mounted on the vehicle so that the spin axis of the flywheel is upright (vertical) and the gimbal axis is substantially parallel to the wheel axes of the vehicle. Gimbal control torque can be applied to the gimbal axis, so the resulting precession axis can be parallel to the vehicle's lean axis (e.g., the roll axis of the vehicle). Alternatively, the gyroscope 106 in a single-axis gimbal frame may be mounted on the vehicle so that the spin axis of the flywheel is parallel to the wheel axes of the vehicle and the gimbal axis is upright (vertical). Gimbal control torque can be applied to the gimbal axis, so the resulting precession axis can be parallel to the vehicle's lean axis (e.g., roll axis of the vehicle).

In some embodiments, one CMG may be provided on the vehicle. The CMG may be disposed, at various locations within the vehicle. In some instances, the CMG may be disposed on a floor of the vehicle. Alternatively, the CMG may be disposed on a roof of the vehicle. Alternatively, CMG may be disposed on a sidewall of the vehicle. In some instances, the CMG may be centered on a longitudinal axis of the vehicle. Alternatively, the CMG may be disposed offset a longitudinal axis of the vehicle. Alternatively, a plurality of CMGs may be provided on the vehicle. For instance, two CMGs may be provided on the vehicle. The plurality of CMGs may be disposed at various locations within the vehicle and operate individually or collectively. In some instances, at least two CMGs in the plurality may be adjacent to one another along a longitudinal axis of the vehicle. Alternatively, at least two CMGs in the plurality may be adjacent to one another along a wheel axis of the vehicle which is substantially orthogonal to the longitudinal axis of the vehicle. Alternatively, no two CMGs in the plurality may be adjacent to one another along the wheel axis or the longitudinal axis of the vehicle. In some embodiments, two CMGs in the plurality may include mass that rotate in opposite directions.

In some embodiments, the CMG may include an Inertia Measurement Unit (IMU) to detect the roll tilt angle of the vehicle. The detected roll tilt angle of the vehicle may be fed to an onboard controller that in turn instructs the CMG's gimbal motor to rotate so that a gyroscopic precession torque is produced to balance the vehicle upright. Alternatively, an IMU may be disposed on the vehicle body to detect the roll tilt angle of the vehicle, and the detected roll tilt angle of the vehicle may be fed to the onboard controller to instruct the CMG's gimbal motor.

The response time of the CMG may be short. The response time of the CMG may be less than or equal to 2.0 sec, 1.0 sec, 0.8 sec, 0.6 sec, 0.4 sec, 0.2 sec, 0.1 sec, 80.0 msec, 60.0 msec, 40.0 msec, 20.0 msec, 10.0 msec, 5.0 msec, 2.0 msec, 1.0 msec, 0.5 msec, 0.1 msec, 0.05 msec or 0.01 msec. Alternatively, the response time of the CMG may be greater than or equal to 0.01 msec, 0.05 msec, 0.1 msec, 0.5 msec, 1.0 msec, 2.0 msec, 5.0 msec, 10.0 msec, 20.0 msec, 40.0 msec, 60.0 msec, 80.0 msec, 0.1 sec, 0.2 sec, 0.4 sec, 0.6 sec, 0.8 sec, 1.0 sec or 2.0 sec. The response time of the CMG may fall within a range between any two of the values described herein. In some embodiments, the response time of the CMG may be 0.1 msec.

The flywheel angular rotating velocity of the CMG may be constant and high. Me flywheel angular rotating velocity of the CMG may be greater than or equal to 1000 rpm (revolutions per minute), 1500 rpm, 2000 rpm, 2500 rpm, 3000 rpm, 3500 rpm, 4000 rpm, 4500 rpm, 5000 rpm, 5500 rpm, 6000 rpm, 6500 rpm, 7000 rpm, 7500 rpm, 8000 rpm, 8500 rpm or 9000 rpm. Alternatively, the flywheel angular rotating velocity of the CMG may be less than or equal to 9000 rpm, 8500 rpm, 8000 rpm, 7500 rpm, 7000 rpm, 6500 rpm, 6000 rpm, 5500 rpm, 5000 rpm, 4500 rpm, 4000 rpm, 3500 rpm, 3000 rpm, 2500 rpm, 2000 rpm, 1500 rpm or 1000 rpm. The flywheel angular rotating velocity of the CMG may fall within a range between any two of the values described herein. In some embodiments, the flywheel angular rotating velocity of the CMG may be 5000 rpm.

The mass of the flywheel of the CMG may be large. The mass of the flywheel of the CMG may be greater than or equal to 1 kg, 5 kg, 10 kg, 15 kg, 20 kg, 25 kg, 30 kg, 35 kg, 40 kg, 45 kg, 50 kg, 55 kg, 60 kg, 65 kg, 70 kg, 75 kg, 80 kg, 85 kg, 90 kg, 100 kg, 150 kg, 200 kg, 250 kg or 300 kg. Alternatively, the mass of the flywheel of the CMG may be less than or equal to 300 kg, 250 kg, 200 kg, 150 kg, 100 kg, 90 kg, 85 kg, 80 kg, 75 kg, 70 kg, 65 kg, 60 kg, 55 kg, 50 kg, 45 kg, 40 kg, 35 kg, 30 kg, 25 kg, 20 kg, 15 kg, 10 kg, 5 kg or 1 kg. The mass of the flywheel of the CMG may fall within a range between any two of the values described herein. In some embodiments, the mass of the flywheel of the CMG may be 50 kg.

A gimbal angle of the flywheel of the CMG 106 with respect to the vehicle body plane may be limited to a predetermined angle range. The gimbal angle of the flywheel of the CMG may be the angle between the flywheel rotating plane and the vehicle body plane. The gimbal angle of the flywheel of the CMG may be less than or equal to ±60 degrees, ±55 degrees, ±50 degrees, ±45 degrees, ±40 degrees, ±35 degrees, ±30 degrees, ±25 degrees, ±20 degrees, ±15 degrees or ±10 degrees, with respect to the vehicle body plane. In some embodiments, the gimbal angle of the flywheel of the CMG may not exceed 45 degrees. In some embodiments, the gimbal angle of the flywheel of the CMG may be measured by an angle sensor disposed on the gimbal axis (e.g., the rotating axis) of the flywheel of the CMG. The angle sensor may be an angle encoder, a photo-electric encoder or a potentiometer. Alternatively, the gimbal angle of the flywheel of the CMG may be measured by a gyroscope disposed on the flywheel of the CMG. Alternatively, the gimbal angle of the flywheel of the CMG may be measured by linear Hall sensors disposed in the gimbal motor. A controller onboard the vehicle may detect that the CMG fails (e.g., in a non-operational state, in which the CMG is not capable of providing stability to vehicle body or stops to operate) if the gimbal angle of the flywheel of the CMG with respect to the vehicle body plane reaches the predetermined angle range.

Figure 2:
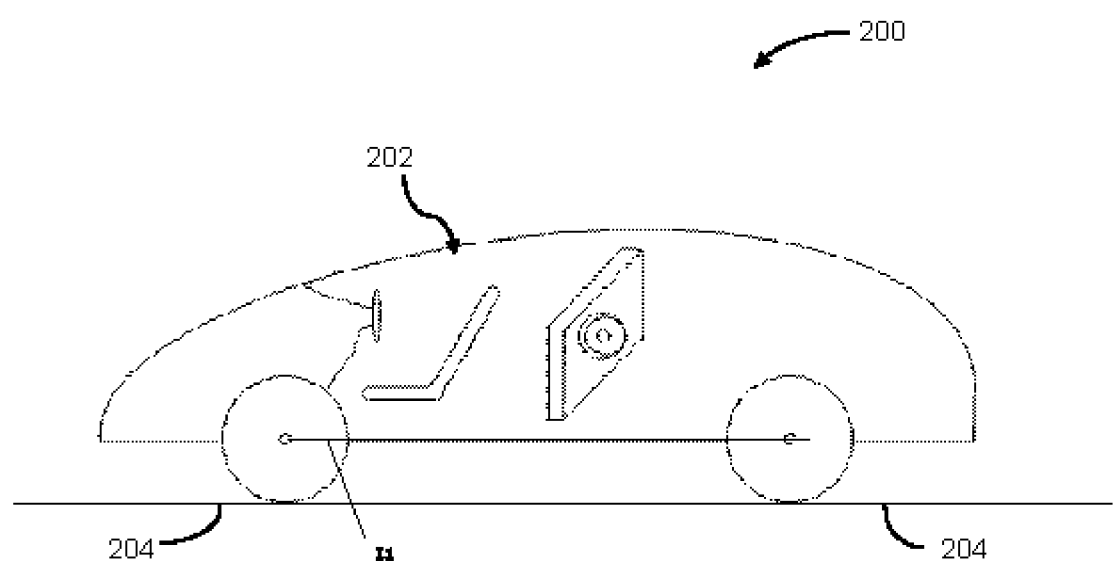
FIG. 2 schematically illustrates an example of a two-wheeled self-balancing vehicle having a flywheel as the balancing member, in accordance with some embodiments of the present disclosure.

FIG. 2 is a schematic showing an example of a two-wheeled self-balancing vehicle 200 having a flywheel as the balancing member. The two-wheeled self-balancing vehicle 200 may include a vehicle body 202 having a longitudinal axis, two wheels 204 which are aligned substantially along the longitudinal axis, each of the at least two wheels being configured to support the vehicle body against a support surface (e.g., ground on which the vehicle moves on), and a flywheel 206 provided on the vehicle.

The flywheel 206 may include a flywheel, a flywheel frame and a spin motor. The rotating velocity of the flywheel may be variable. Stability about a longitudinal axis (e.g., the roll axis of the vehicle) of the vehicle body may be achieved and adjusted from the rotating flywheel by varying a spinning direction of the flywheel. For instance, if the vehicle body tilts to one side with respect to the longitudinal axis of the vehicle body, the flywheel may spin to the same side and a counterforce generated by the spinning flywheel may balance the vehicle body upright. The flywheel may be mounted on the vehicle so that the spin axis of the flywheel is substantially parallel to the longitudinal axis of the vehicle body.

In some embodiments, one flywheel may be provided on the vehicle. The flywheel may be disposed at various locations within the vehicle. Alternatively, a plurality of flywheels may be provided on the vehicle. In some embodiments, the flywheel may include an Inertia Measurement Unit (IMU) to detect the roll tilt angle of the vehicle. The detected, roll tilt angle of the vehicle may be fed to an onboard controller that in turn instructs the flywheel's spin motor to rotate in a corresponding direction so that a counterforce is produced to balance the vehicle upright. Alternatively, an IMU may be disposed on the vehicle body to detect the roll tilt angle of the vehicle, and the detected roll tilt angle of the vehicle may be fed to the onboard controller to instruct the spinning direction of the flywheel's spin motor.

The mass of the flywheel may be large. The mass of the flywheel may be greater than or equal to 1 kg, 5 kg, 10 kg, 15 kg, 20 kg, 25 kg, 30 kg, 35 kg, 40 kg, 45 kg, 50 kg, 55 kg, 60 kg, 65 kg, 70 kg, 75 kg, 80 kg, 85 kg, 90 kg, 100 kg, 150 kg, 200 kg, 250 kg or 300 kg. Alternatively, the mass of the flywheel may be less than or equal to 300 kg, 250 kg, 200 kg, 150 kg, 100 kg, 90 kg, 85 kg, 80 kg, 75 kg, 70 kg, 65 kg, 60 kg, 55 kg, 50 kg, 45 kg, 40 kg, 35 kg, 30 kg, 25 kg, 20 kg, 15 kg, 10 kg, 5 kg or 1 kg. The mass of the flywheel may fall within a range between any two of the values described herein. In some embodiments, the mass of the flywheel may be 50 kg.

The angular rotating velocity of the flywheel may be variable and high. An upper limit of the angular rotating velocity of the flywheel may be less than or equal to 9000 rpm, 8500 rpm, 8000 rpm, 7500 rpm, 7000 rpm, 6500 rpm, 6000 rpm, 5500 rpm, 5000 rpm, 4500 rpm, 4000 rpm, 3500 rpm, 3000 rpm, 2500 rpm, 2000 rpm, 1500 rpm or 1000 rpm. The angular rotating velocity of the flywheel may fall within a range between any two of the values described herein. In some embodiments, the angular rotating velocity of the flywheel may not exceed 5000 rpm. The angular rotating velocity of the flywheel may be measured by an angular velocity meter disposed on the spin axis of the spin motor. A controller, onboard the vehicle may detect that the flywheel fails (e.g., in a non-operational state, in which the flywheel is not capable of providing stability to vehicle body or stops to operate) if the angular rotating velocity of the flywheel reaches the upper limit.

Figure 3:
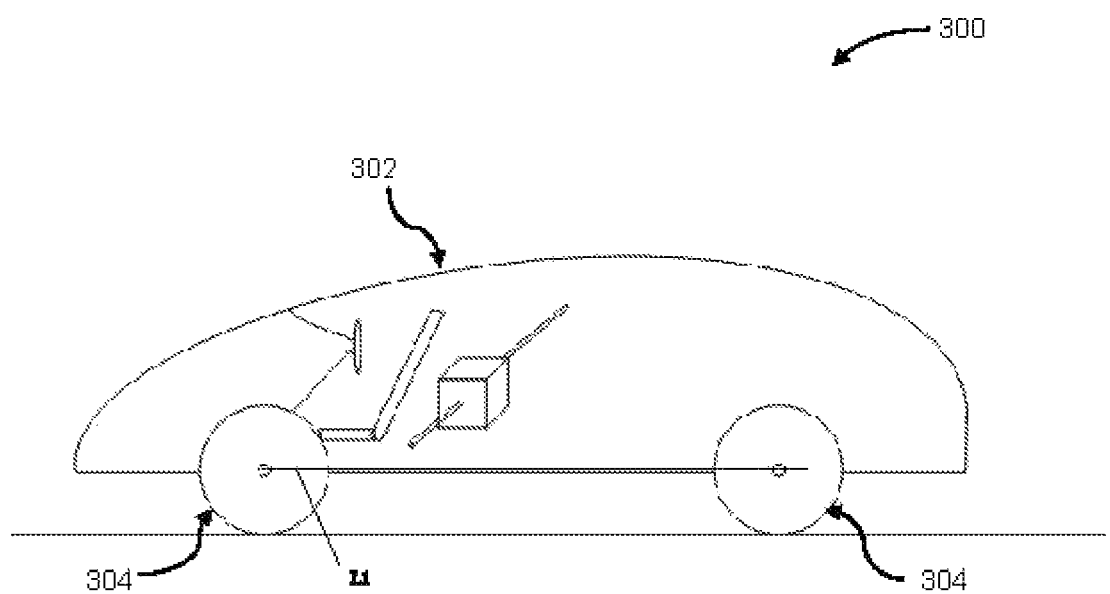
FIG. 3 schematically illustrates an example of a two-wheeled self-balancing vehicle having a shifting weight as the balancing member, in accordance with some embodiments of the present disclosure.

FIG. 3 schematically illustrates an example of a two-wheeled self-balancing vehicle 300 having a shifting, weight as the balancing member. The two-wheeled self-balancing vehicle 300 may include a vehicle body 302 having a longitudinal axis, two wheels 304 which are aligned substantially along the longitudinal axis, each of the at least two wheels being configured to support the vehicle body against a support surface (e.g., ground on which the vehicle moves on), and a shifting weight 306 provided on the vehicle.

The shifting weight 306 may include a rod, a mass slidably sleeved on the rod such that the mass can move along the rod and a frame on which the rod is fixed. In some embodiments, the shifting weight 306 may be mounted on the vehicle so that the extending direction of the rod is substantially parallel to the wheel axes of the vehicle (e.g., substantially orthogonal to the longitudinal axis of the vehicle). The mass of the shifting weight 306 can slide along the rod to compensate a leaning of the vehicle about the vehicle's lean axis (e.g., roll axis of the vehicle). For instance, if the vehicle leans towards left direction about the vehicle's lean axis, the mass may slide towards the opposite direction (e.g., right direction) along the rod so that the vehicle is kept upright.

In some embodiments, one shifting weight may be provided on the vehicle. The shifting weight may be disposed at various locations within the vehicle. In some instances, the shifting weight may be disposed on a floor of the vehicle. Alternatively, the shifting weight may be disposed on a roof of the vehicle. Alternatively, shilling weight may be disposed on a sidewall of the vehicle. In some instances, the shifting weight may be centered on a longitudinal axis of the vehicle. Alternatively, the shifting weight may be disposed offset a longitudinal axis of the vehicle. Alternatively, a plurality of shifting weights may be provided on the vehicle. For instance, two shifting weights may be provided on the vehicle. The plurality of shifting weights may be disposed at various locations within the vehicle and operate individually or collectively. In some instances, at least two shifting weights in the plurality may be adjacent to one another along a longitudinal axis of the vehicle. Alternatively, at least two shifting weights in the plurality may be adjacent to one another along a wheel axis of the vehicle which is substantially orthogonal to the longitudinal axis. Alternatively, no two shilling weights in the plurality may be adjacent to one another along the wheel axis or the longitudinal axis of the vehicle.

In some embodiments, the shifting weight may include an Inertia Measurement Unit (IMU) to detect the roll tilt angle of the vehicle. The detected roll tilt angle of the vehicle may be fed to an onboard controller that in turn instructs the mass of the shifting weight to slide towards an opposite direction of the vehicle's roll tilt so that the vehicle is balanced upright. Alternatively, an IMU may be disposed on the vehicle body to detect the roll tilt angle of the vehicle, and the detected roll tilt angle of the vehicle may be fed to the onboard controller to instruct the shifting direction of the mass of the shifting weight.

The response time of the shifting weight may be short. The response time of the shifting weight may be less than or equal to 2.0 sec, 1.0 sec, 0.8 sec, 0.6 sec, 0.4 sec, 0.2 sec, 0.1 sec, 80.0 msec, 60.0 msec, 40.0 msec, 20.0 msec, 10.0 msec, 5.0 msec, 2.0 msec, 1.0 msec, 0.5 msec, 0.1 msec, 0.05 msec or 0.01 msec. Alternatively, the response time of the shifting weight may be greater than or equal to 0.01 msec, 0.05 msec, 0.1 msec, 0.5 msec, 1.0 msec, 2.0 msec, 5.0 msec, 10.0 msec, 20.0 msec, 40.0 msec, 60.0 msec, 80.0 msec, 0.1 sec, 0.2 sec, 0.4 sec, 0.6 sec, 0.8 sec, 1.0 sec or 2.0 sec. The response time of the shifting weight may fall within a range between any two of the values described herein. In some embodiments, the response time of the shifting weight may be 0.1 msec.

The weight of the mass of the shifting weight may be large. The weight of the mass of the shifting weight may be greater than or equal to 1 kg, 5 kg, 10 kg, 15 kg, 20 kg, 25 kg, 30 kg, 35 kg, 40 kg, 45 kg, 50 kg, 55 kg, 60 kg, 65 kg, 70 kg, 75 kg, 80 kg, 85 kg, 90 kg, 100 kg, 150 kg, 200 kg, 250 kg or 300 kg. Alternatively, the weight of the mass of the shifting weight may be less than or equal to 300 kg, 250 kg, 200 kg, 150 kg, 100 kg, 90 kg, 85 kg, 80 kg, 75 kg, 70 kg, 65 kg, 60 kg, 55 kg, 50 kg, 45 kg, 40 kg, 35 kg, 30 kg, 25 kg, 20 kg, 15 kg, 10 kg, 5 kg or 1 kg. The weight of the mass of the shifting weight may fall within a range between any two of the values described herein. In some embodiments, the weight of the mass of the shifting weight may be 50 kg.

The shifting weight may fail if it reaches an end of the lateral rod on, which the mass of the shifting weight slidably sleeved. For instance, if the vehicle is not balanced back even if the mass of the shifting weight reaches the far end of the rod in the opposite direction, the shifting weight may fail to balance the vehicle body. A controller onboard the vehicle may detect that the shifting weight fails (e.g., in a non-operational state, in which the shifting weight is not capable of providing stability to vehicle body or stops to operate) if the mass reaches an end of the lateral rod on which the mass slidably sleeved.

In some embodiments, a plurality of balancing members may be provided onboard the vehicle to balance the vehicle body with respect to the support surface. In some instance, the plurality of balancing members is of the same type (e.g., CMG). For instance, more than one CMG, flywheel or shifting weight may be provided onboard the vehicle. The orientation and spatial arrangement of the plurality of same-type balancing members can be arbitrary as long as they collectively balance the vehicle body in one or more dimensions, as discussed elsewhere herein. Alternatively, the individual balancing members of the plurality of balancing members may be of different types. For instance, any combination of CMG(s), flywheel(s) and shifting weight(s) may be provided onboard the vehicle. In some instances, a first balancing member may be adjacent to a second balancing member along a wheel axis that is orthogonal to the longitudinal axis of the vehicle body. Alternatively, a first balancing member may be adjacent to a second balancing member along the longitudinal axis of the vehicle body.

Figure 4:
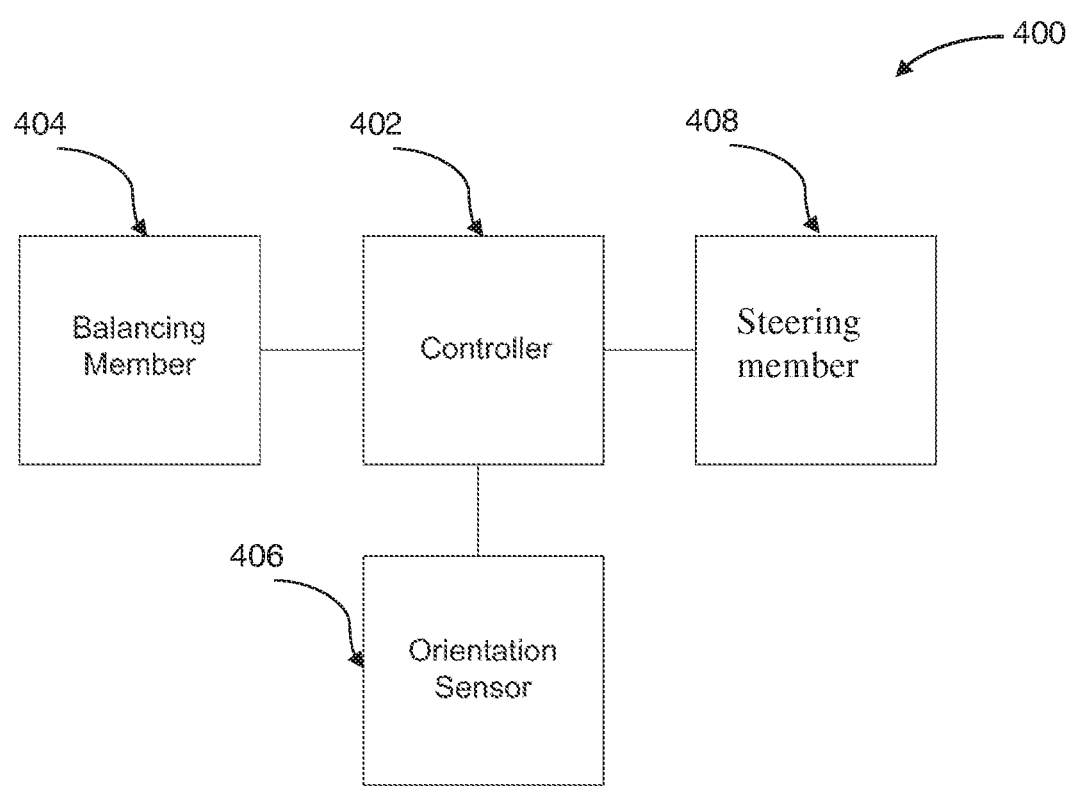
FIG. 4 schematically illustrates an example of a control system for two-wheeled self-balancing vehicles, in accordance with some embodiments of the present disclosure.

FIG. 4 schematically illustrates an example of a control system for two-wheeled self-balancing vehicles, in accordance with some embodiments of the present disclosure. A controller 402 may be in communication with one or more balancing members 404 and a steering member 408. In some embodiments, the controller may also be communication with an orientation sensor 406 which is optional.

The balancing member 404 may facilitate self-balancing of the vehicle body against the support surface (e.g., the ground on which the vehicle drives). The balancing member may be a CMG, a flywheel, a shifting weight or a combination thereof, as discussed elsewhere herein. The balancing member may be capable, of output an operating state signal indicative of the operating state thereof, as discussed elsewhere herein. In some embodiments, the operating state of the balancing member may include but not limited to an operational state (e.g., the balancing member can function to balance the vehicle body), a faulty state (e.g., the balancing member may have mechanical or electrical problem and can't operate to balance the vehicle body) or a non-operational state (e.g., the balancing member may reach a limit of balancing the vehicle body or stop to operate). For instance the operational state may correspond to a state of the balancing member under which the balancing member operates properly, the faulty state may correspond to a state of the balancing member under which the balancing member encounters mechanical or electrical fault and thus fails to function, and the non-operational state may correspond to a state of the balancing member under which the balancing member can't balance the vehicle body although no mechanical or electrical fault occurs.

The steering member 408 may be coupled to at least one of the at least two wheels of the vehicle. The steering member may be directly coupled to the at least one of the wheels or through a transmission mechanism. The steering member may be movable to provide rotation of the at least one of the at least two wheels along a second axis which is angled with respect to a longitudinal axis of the vehicle body. For instance, the steering member may be rotatable and a driver of the vehicle may rotate the steering member (e.g., a steering wheel) such that the front wheel of the vehicle is rotated along the second axis to vary a driving direction of the vehicle. In some examples, the steering member may be substantially circular. In other examples, the steering member may include handles. For example, the driver may hold the handles to vary a driving direction of the vehicle.

A resistance to movement of the steering member may be manually controllable. For instance, the driver may set a constant resistance to movement of a steering wheel. A resistance to movement of the steering member may also be automatically controllable based upon an operating state or change thereof of the vehicle with the aid of a controller onboard or off-board the vehicle. The operating state of the vehicle may be selected from the group consisting of a state of the at least one balancing member and a degree of tilt of the vehicle body with respect to the gravitational acceleration vector. In some examples, when the balancing member is in an operational state, the resistance to movement of the steering member may be increased before the state of the balancing member transitions from an operational state to a non-operational state, and a movement of the steering member may be prohibited upon the state of the balancing member transitioning from an operational state to a non-operational state. For instance, when the balancing member is going to fail (e.g., fail to balance the vehicle), the resistance to turning the steering wheel may be increased such that the driver is informed the operating state of the balancing member and can be more cautious in the steering operation. For another instance, when the balancing member is failing, any further turning of the steering wheel may be prohibited such that the vehicle can be balanced by the balancing member. In, some examples, when the balancing member is in a faulty or non-operational state, the resistance to movement of the steering member may be controlled. For instance, when the balancing member has failed or in a mechanical or electrical fault, any turning of the steering wheel may be prohibited until the vehicle can be balanced by the balancing member again.

The operating state of the balancing member may be detected by the controller 402, which may then control the resistance to movement of the steering member based upon the operating state or change thereof of the vehicle. In some instances, the controller may comprise one or more computer processors that are individually or collectively programmed to control the resistance to movement of the steering member based upon the operating state or change thereof of the vehicle. The operating state of the vehicle may be selected from the group consisting of a state of the at least one balancing member and a degree of tilt of the vehicle body with respect to the gravitational acceleration vector, as discussed elsewhere herein. For example, the one or more computer processors may be programmed to detect the operating state of the balancing member, and control the resistance to movement of the steering member based upon the state of the balancing member.

In some embodiments, one or more orientation sensor 406 may be provided in communication with the controller. The orientation sensor may be onboard the vehicle to measure an orientation of the vehicle body. The orientation of the vehicle body may be an attitude or posture of the vehicle body with respect to three axes of the global coordinate. In some instances, the orientation sensor may be a gyroscope which measures a tilt angle of the vehicle body with respect to a gravitational acceleration vector. The measured orientation of the vehicle body and the change there may be used by the controller to control the resistance to movement of the steering member. For instance, the one or more computer processors of the controller may be individually or collectively programmed to detect the degree of tilt or change thereof of the vehicle body with respect to the gravitational acceleration vector, and control the resistance to movement based upon the degree of tilt or change thereof of the vehicle body.

In some instances, the one or more computer processors of the controller may be individually or collectively programmed to increase the resistance to movement of the steering member when the degree of tilt or change thereof of the vehicle body with respect to the gravitational acceleration vector reaches a predetermined orientation threshold. For example, the one or more computer processors may instruct to increase the resistance to turn the steering wheel when the degree of tilt of the vehicle body with respect to the gravitational acceleration vector reaches a predetermined orientation threshold, such as 45 degrees, 40 degrees, 35 degrees, 30 degrees, 25 degrees or 20 degrees. For another example, the one or, more computer processors may instruct to increase the resistance to turn the steering wheel when a change in the degree of tilt of the vehicle body with respect to the gravitational acceleration vector reaches a predetermined orientation threshold, such as 5 degree per second. In this circumstance, the driver may be informed of the degree of tilt of the vehicle body and the risk of vehicle's tuning or flipping over, such that the driver may be cautious in turning the steering wheel. For another example, the one or more computer processors may instruct to increase the resistance to turn the steering member before the degree of tilt of the vehicle body with respect to the gravitational acceleration vector reaches the predetermined orientation threshold (e.g., 30 degree). In this circumstance, the resistance to turn the steering member may be increased when the degree of tilt of the vehicle body with respect to the gravitational acceleration vector reaches 25 degrees, which is close to the predetermined orientation threshold, for example 30 degrees. For still another example, the one or more computer processors may instruct to prohibit movement of the steering member upon the degree of tilt of the vehicle body reaching the predetermined orientation threshold. In this circumstance, the driver may not be able to further turn the steering wheel if the degree of tilt of the vehicle body has reached the predetermined orientation threshold for example 30 degrees.

During a driving of the self-balancing vehicle, the controller may detect the operating state of the one or more balancing members (e.g., a CMG, a flywheel, a shifting weight, or any combination thereof) and/or the degree of tilt of the vehicle body with respect to the gravitational acceleration vector. The detecting, of the operating state of the one or more balancing, members and/or the degree of tilt of the vehicle body with respect to the gravitational acceleration vector may be performed at a regular timing. For instance, the controller may detect the operating state of the one or more balancing members and/or the degree of tilt of the vehicle body with respect to the gravitational acceleration vector every 0.01 msec, 0.05 msec, 0.1 msec, 0.5 msec, 1.0 msec, 2.0 msec, 5.0 msec, 10.0 msec, 20.0 msec, 40.0 msec, 60.0 msec, 80.0 msec, 0.1 sec, 0.2 sec, 0.4 sec, 0.6 sec, 0.8 sec, 1.0 sec or 2.0 sec. In some embodiments, the balancing member may send an operating state signal to the controller indicative of an operating state thereof, including an operational state, a fault state and a non-operational state, as discussed elsewhere herein. The operating state signal may be sent from the balancing member to the controller at a regular timing, such as every 0.01 msec, 0.05 msec, 0.1 msec, 0.5 msec, 1.0 msec, 2.0 msec, 5.0 msec, 10.0 msec, 20.0 msec, 40.0 msec, 60.0 msec, 80.0 msec, 0.1 sec, 0.2 sec, 0.4 sec, 0.6 sec, 0.8 sec, 1.0 sec or 2.0 sec. The controller may control the resistance to movement of the steering member based upon the operating state or change thereof of the one or more balancing members and/or the degree of tilt of the vehicle body with respect to the gravitational acceleration vector.

If more than one balancing members are provided onboard the vehicle, the controller may increase the resistance to movement of the steering member before the operating state of one of the balancing members (e.g., 1 out of 3) is detected as transitioning from an operational state o a non-operational state. Alternatively, the controller may increase the resistance to movement of the steering member before the operating states of all of the balancing members (e.g., 3 out of 3) are detected as transitioning from an operational state to a non-operational state. Alternatively, the controller may increase the resistance to movement of the steering, member before the operating states of a predetermined number of the balancing members (e.g., 2 out of 3) are detected as transitioning from an operational state to a non-operational state. Alternatively, the controller may increase the resistance to movement of the steering member before the operating states, of a predetermined percentage of the balancing members (e.g., 70% out of 100%, rounded to a large integer) are detected as transitioning from an operational state to anon-operational state.

The resistance to movement of the steering member may be modulated by the controller based upon the operating state or change thereof of the vehicle. In some examples, resistance to movement of the steering member may be modulated based upon the operating state of the one or more balancing members. In, some embodiments, the increasing of the resistance to movement of the steering member may be modulated by the controller in a linearly increasing manner. For example, when the operating state of the balancing member is detected as transitioning, from an operational state to a non-operational state, the resistance to movement of the steering member may be increased linearly while the steering member is further turned, until upon the operating state of the balancing member is detected as transitioning from an operational state to a non-operational state. Alternatively, the increasing of the resistance to movement of the steering member may be implemented in a fixed resistance manner. For example, when the operating state of the balancing member is detected as transitioning from an operational state to a non-operational state, a fixed large resistance to movement of the steering member may be imposed to the steering member while the steering member is further turned.

The resistance to movement of the steering member may be maintained constant when the operating state of the balancing, member is not detected as transitioning from an operational state to a non-operational state, for example, when the operating state of the balancing member is an operational state. The resistance to movement of the steering member may be decreased when the operating state of the balancing member is detected as transitioning back to an operational state from a non-operational state.

The resistance to movement of the steering, member may be modulated/changed by the controller at a frequency of at least about 1 Hz (e.g., modulating once per second), 2 Hz, 3 Hz, 4 Hz, 5 Hz, 10 Hz, 20 Hz, 30 Hz, 40 Hz, 50 Hz, 60 Hz, 70 Hz, 80 Hz, 90 Hz, 100 Hz, 500 Hz or 1000 Hz. The frequency of modulating the resistance to movement of the steering member may fall within a range between any two of the values described herein. In some embodiments, the frequency of modulating the resistance to movement of the steering member may be at least 2 Hz.

In some embodiments, the at least one balancing member 404 may include a control moment gyroscope (CMG). The operating state of the CMG may determined based upon whether a gimbal angle of the CMG with respect to the vehicle body reaches a predetermined gimbal angle limit, as discussed elsewhere herein. The gimbal angle of the CMG may be the angle between the gimbal rotating plane and the vehicle body plane. For instance, the predetermined gimbal angle limit may be ±30 degrees (e.g., +30 degrees may indicate that the CMG inclines upward with respect to the vehicle body, and −30 degrees may indicate that the CMG inclines downward with respect to the vehicle body), ±35 degrees, ±40 degrees, ±45 degrees, ±50 degrees, ±55 degrees, ±60 degrees, ±65 degrees, ±70 degrees, ±75 degrees, ±80 degrees or ±85 degrees. The predetermined gimbal angle limit may fall within a range between any two of the values described herein. In some embodiments, the predetermined gimbal angle limit may be ±45 degrees.

The one or more computer processors of the controller may be individually or collectively programmed to increase the resistance to movement of the steering member when the gimbal angle of the CMG reaches a predetermined percentage of the predetermined gimbal angle limit. The predetermined percentage may be at least about 50%, 55%, 60%, 65%, 70%, 75%, 80%, 85%, 90% or 95%. The predetermined percentage may fall within a range between any two of the values described herein. In some embodiments, the predetermined percentage may be at least about 80%. For example, the one or more computer processors of the controller may be individually or collectively programmed to increase the resistance to movement of the steering member when the gimbal angle of the CMG reaches 80% of a 45 degrees gimbal angle limit, which is 36 degrees, such that the driver may be informed of the operating state of the CMG by feeling greater resistance in turning the steering wheel. In this circumstance, the driver may be capable of continuing to turn the steering wheel until the gimbal angle of the CMG reaches the predetermined gimbal angle limit 45 degrees, under which state any further turning of the steering wheel is prohibited to avoid the CMG entering into the non-operational state.

Alternatively, the at least one balancing member 404 may include a fly-wheel. The operating state of the flywheel may be determined based upon whether a rate of rotation of the flywheel reaches a predetermined limit, as discussed elsewhere herein. The predetermined limit of the rate of rotation of the flywheel may be 9000 rpm, 8500 rpm, 8000 rpm, 7500 rpm, 7000 rpm, 6500 rpm, 6000 rpm, 5500 rpm, 5000 rpm, 4500 rpm, 4000 rpm, 3500 rpm, 3000 rpm, 2500 rpm, 2000 rpm, 1500 rpm or 1000 rpm. The predetermined limit of the rate of rotation of the flywheel may fall within a range between any two of the values described herein. In some embodiments, predetermined limit of the rate of rotation of the flywheel may be 5000 rpm.

The one or more computer processors of the controller may be individually or collectively programmed to increase the resistance to movement of the steering member when the rate of rotation of the flywheel reaches a predetermined percentage of the predetermined limit of the rate of rotation. The predetermined percentage may be 50%, 55%, 60%, 65%, 70%, 75%, 80%, 85%, 90% or 95%. The predetermined percentage may fall within a range between any two of the values described herein. In some embodiments, the predetermined percentage may be 80%. For example, the one or more computer processors of the controller may be individually or collectively programmed to increase the resistance to movement of the steering member when the rate of rotation of the flywheel reaches 80% of a 5000 rpm limit of rate of rotation, which is 4000 rpm, such that the driver may be informed of the operating state of the flywheel by feeling greater resistance in turning the steering wheel. In this circumstance, the driver may be capable of continuing to turn the steering wheel until the rate of rotation of the flywheel reaches the predetermined limit of the rate of rotation 5000 rpm, under which state any further turning of the steering wheel is prohibited to avoid the flywheel entering into the non-operational state.

Alternatively, the at least one balancing member 404 may include a shifting weight. The shifting weight may be movable along a direction substantially perpendicular to the longitudinal axis of the vehicle body. The operating state of the shifting weight may be determined based upon whether a mass of the shifting weight reaches an end of a sliding rod along which the mass slides, as discussed elsewhere herein. The one or more computer processors of the controller may be individually or collectively programmed to increase the resistance to movement of the steering member when the mass of the shifting weight reaches a predetermined percentage of a total length of the sliding rod. The predetermined percentage may be 50%, 55%, 60%, 65%, 70%, 75%, 80%, 85%, 90% or 95%. The predetermined percentage may fall within a range between any two of the values described herein. In some embodiments, the predetermined percentage may be 80%. For example, the one or more computer processors of the controller may be individually or collectively programmed to increase the resistance to movement of the steering member when the mass of the shifting weight reaches 80% of total length of the sliding rod, such that the driver may be informed of the operating state of the shifting weight by feeling greater resistance in turning the steering wheel. In this circumstance, the driver may be capable of continuing to turn the steering wheel until the mass of the shifting weight reaches the end of the sliding rod, under which state any further turning of the steering wheel is prohibited to avoid the shifting weight entering into the non-operational state.

Figure 5:
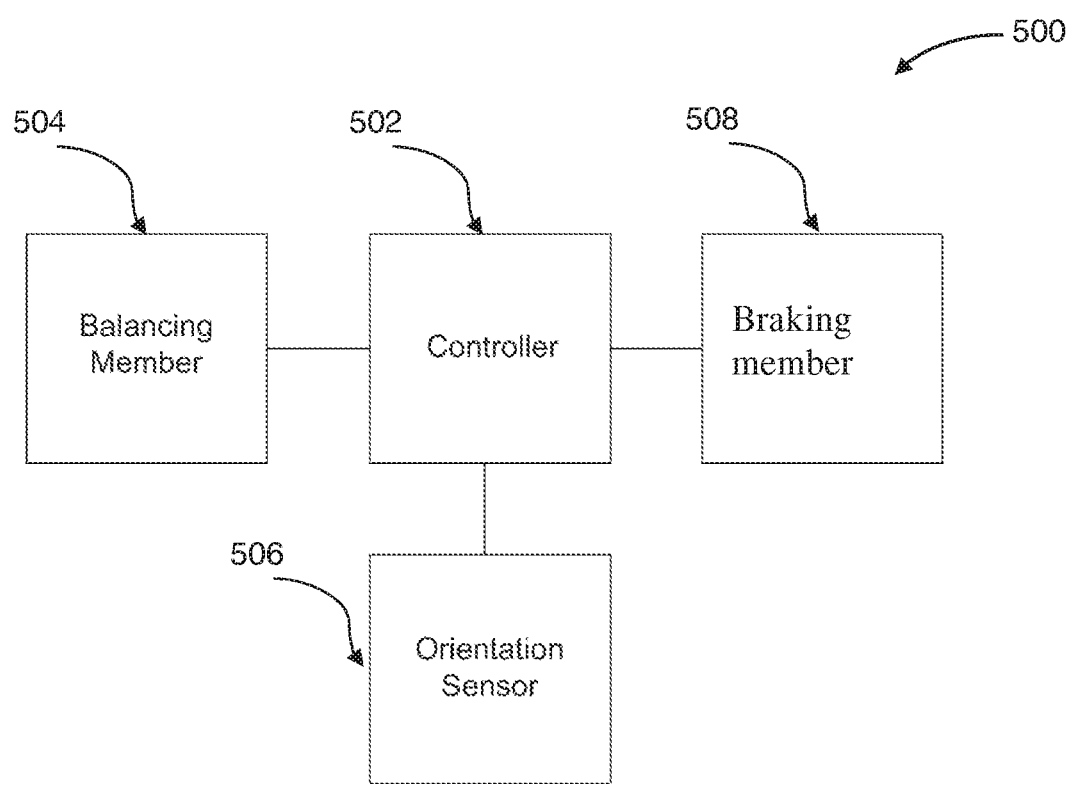
FIG. 5 schematically illustrates another example of a control system for two-wheeled self-balancing vehicles, in accordance with some embodiments of the present disclosure.

FIG. 5 schematically illustrates another example of a control system for two-wheeled self-balancing vehicles, in accordance with some embodiments of the present disclosure. A controller 502 may be in communication with one or more balancing members 504 and at least one braking member 508. In some embodiments, the controller may also be communication with an orientation sensor 506 which is optional.

The balancing member 504 may facilitate self-balancing of the vehicle body against the support surface (e.g., the ground on which the vehicle drives). The balancing member may be a CMG, a flywheel, a shifting weight or a combination thereof, as discussed elsewhere herein. The balancing member may be capable of output an operating state signal indicative of the operating state thereof, as discussed elsewhere herein. In some embodiments, the operating state, of the balancing member may include but not limited to an operational state (e.g., the balancing member can function to balance the vehicle body), a faulty state (e.g., the balancing member may have mechanical or electrical problem and can't operate to balance the vehicle body) or a non-operational state (e.g., the balancing member may reach a limit of balancing the vehicle body or stop to operate).

The at least one braking member 508 may be coupled to at least one of or both of the at least two wheels of the vehicle, and, control a resistance to motion of the at least one of the at least two wheels against the support surface based upon an operating state or change thereof of the vehicle. In some embodiments, the operating state may be selected from the group consisting of a state of the at least one balancing member and a degree of tilt of the vehicle body with respect to the gravitational acceleration vector. The braking member may comprise one or two or more braking member that is in contact with the wheel of the vehicle. In some examples, the braking member may be a brake pad which may slow the vehicle down by a friction between the brake pad and the wheel.

A resistance to motion of the wheels may be manually controllable. For instance, the driver may increase and/or decrease the resistance to motion of the wheels by operating a petal such that a velocity of the vehicle may be increased and/or decreased. A resistance to motion of the wheels may also be automatically controllable based upon an operating state or change thereof of the vehicle with the aid of a controller onboard or off-board the vehicle. The operating state of the vehicle may be selected from the group consisting of a state of the at least one balancing member and a degree of tilt of the vehicle body with respect to the gravitational acceleration vector. In some examples, when the balancing member is in an operational state, the resistance to motion of the wheels may be increased before the state of the balancing member transitions from an operational state to a non-operational state so as to prevent an increase in a velocity of the self-balancing vehicle, and the resistance to motion may be increased upon the state of the balancing member transitioning, from an operational state to a non-operational state so as to decrease a velocity of the self-balancing vehicle. For instance, when the balancing member is going to fail (e.g., fail to balance the vehicle), the resistance to turning the steering wheel may be increased such that the driver is informed the operating state of the balancing member and can be more cautious in the steering operation. For another instance, when the balancing member is failing, any further increase in a velocity of the vehicle may be prohibited such that the vehicle can be balanced by the balancing, member during a turning of the vehicle. In some examples, when the balancing member is in a faulty or non-operational state, the resistance to motion may be controlled. For instance, when the balancing member has failed or in a mechanical or electrical fault, the velocity of the vehicle may be forcibly decreased by increasing the resistance to motion until the vehicle can be balanced by the balancing member again.

The operating state of the balancing member 504 may be detected by the controller 502, which may then control the resistance to motion of the wheels based upon the operating state or change thereof of the vehicle. In some instances, the controller may comprise one or more computer processors that are individually or collectively programmed to control the resistance to motion based upon the operating state or change thereof of the vehicle. The operating state of the vehicle may be selected from the group consisting of a state of the at least one balancing member and a degree of tilt of the vehicle body with respect to the gravitational acceleration vector, as discussed elsewhere herein. For example, the one or more computer processors may be programmed to detect the state of the balancing member, and control the resistance to motion of the wheels based upon the operating state of the balancing member.

In some embodiments, one or more orientation sensor 506 may be provided in communication with the controller. The orientation sensor may be onboard the vehicle to measure an orientation of the vehicle body. In some instances, the orientation sensor may be a gyroscope which measures a tilt angle of the vehicle body with respect to a gravitational acceleration vector. The measured orientation of the vehicle body and the change there may be used by the controller to control the resistance to motion of the wheels. For instance, the one or more computer processors of the controller may be individually or collectively programmed to detect the degree of tilt or change thereof of the vehicle body with respect to the gravitational acceleration vector, and control the resistance to motion based upon the degree of tilt or change thereof of the vehicle body. In some examples, the one or more computer processors of the controller may be individually or collectively programmed to increase the resistance to motion when the degree of tilt or change thereof with respect to the gravitational acceleration vector reaches a predetermined orientation threshold, such as 30 degrees. In other examples, the one or more computer processors may instruct to increase the resistance motion when a change in the degree of tilt of the vehicle body with respect to the gravitational acceleration vector reaches a predetermined orientation threshold, such as 5 degree per second. In some examples, the one or more computer processors of the controller may be individually or collectively programmed to direct the braking member to increase the resistance to motion so as to prevent an increase in a velocity of the self-balancing vehicle before the degree of tilt or change thereof with respect to the gravitational acceleration vector reaches the predetermined threshold, such as 30 degree or 5 degree per second. In other examples, the one or more computer processors of the controller may be individually or collectively programmed to direct the braking member to increase the resistance to motion so as to decrease a velocity of the self-balancing vehicle upon the degree of tilt or change thereof with respect to the gravitational acceleration vector reaching the predetermined threshold.

In some embodiments, the at least one balancing member 504 may include a control moment gyroscope (CMG). The operating state of the CMG may be determined based upon whether a gimbal angle of the CMG with respect to the vehicle body reaches a predetermined gimbal angle limit, as discussed elsewhere herein. In some examples, the state of the at least one balancing member may include an operating state of the CMG that is determined based upon whether a gimbal angle of the CMG with respect to the vehicle body reaches a predetermined gimbal angle limit, such as ±45 degrees. In some examples, the one or more computer processors of the controller may be individually or collectively programmed to increase the resistance to motion when the gimbal angle of the CMG reaches a predetermined percentage of the predetermined gimbal angle limit, such as 80% of the predetermined gimbal angle limit, to prevent an increase in a velocity of the self-balancing vehicle. In this circumstance, the one or more computer processors of the controller may be individually or collectively programmed to increase the resistance to motion once the gimbal angle of the CMG further increases and reaches the predetermined gimbal angle, so as to decrease a velocity of the self-balancing vehicle.

Alternatively, the at least one balancing member 504 may include a flywheel. In some examples, the operating state of the flywheel may be determined based upon whether a rate of rotation of the flywheel reaches a predetermined limit, as discussed elsewhere herein. In some examples, the state of the at least one balancing member may include an operating state of the flywheel that is determined based upon whether a rate of rotation of the flywheel reaches a predetermined limit, such as 5000 rpm. In some examples, the one or more computer processors of the controller may be individually or collectively programmed to increase the resistance to motion when the rate of rotation of the flywheel reaches a predetermined percentage of the predetermined limit of the rate of rotation, such as 80% of the predetermined limit of the rate of rotation, to prevent an increase in a velocity of the self-balancing vehicle. In this circumstance, the one or more computer processors of the controller may be individually or collectively programmed to increase the resistance to motion once the rate of rotation of the flywheel reaches the predetermined limit of the rate of rotation, so as to decrease a velocity of the self-balancing vehicle.

Alternatively, the at least one balancing member 504 may include a shifting weight. The shifting weight may be movable along a direction substantially perpendicular to the longitudinal axis of the vehicle body. The operating state of the shifting weight may be determined based upon whether a mass of the shifting weight reaches an end of a sliding rod along which the mass slides as discussed elsewhere herein. In some examples, the state of the at least one balancing member may include an operating state of the shifting weight that is determined based upon whether a mass of the shifting weight reaches the end of the sliding rod. In some examples, the one or more computer processors of the controller may be individually or collectively programmed to increase the resistance to motion when the mass of the shifting weight reaches a predetermined percentage of a total length of the sliding rod, such as 80% of a total length of the sliding rod, to prevent an increase in a velocity of the self-balancing vehicle. In this circumstance, the one or more computer processors of the controller may be individually or collectively programmed to increase the resistance to motion once the mass of the shifting weight reaches the end of the sliding rod, so as to decrease a velocity of the self-balancing vehicle.

Figure 6:
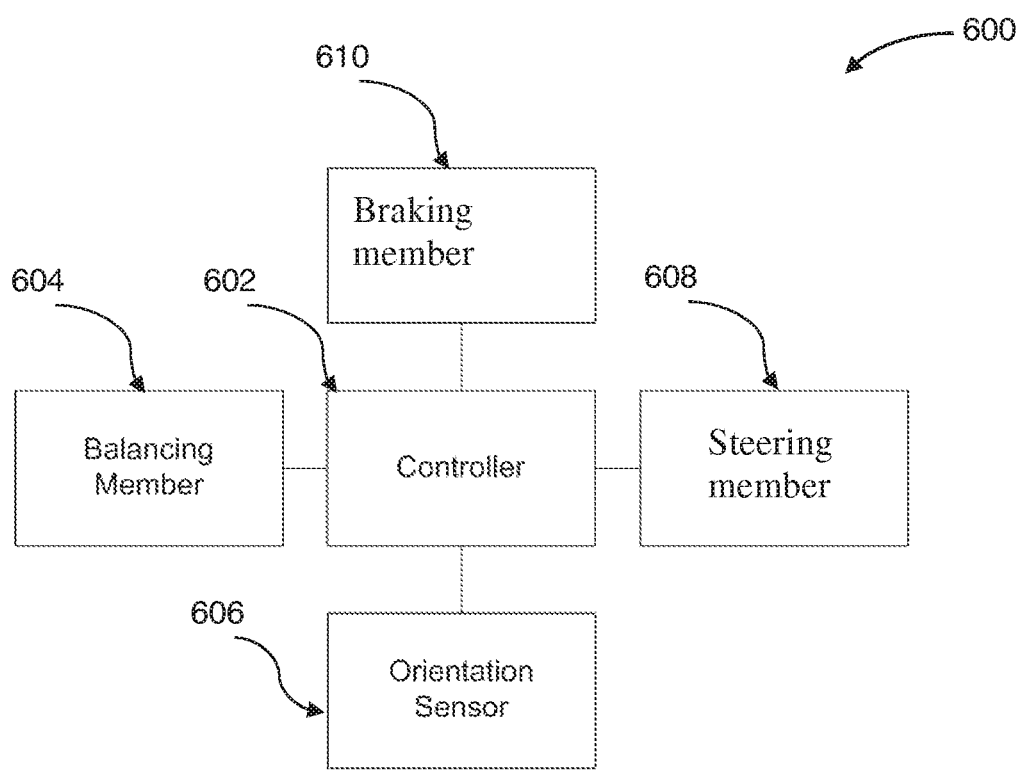
FIG. 6 schematically illustrates another example of a control system for two-wheeled self-balancing vehicles, in accordance with some embodiments of the present disclosure.

FIG. 6 schematically illustrates another example of a control system for two-wheeled self-balancing vehicles, in accordance with some embodiments of the present disclosure. A controller 602 may be in communication with one or more balancing members 604, a steering member 608 and at least one braking member 610. The balancing, member may be a CMG, a flywheel, a shifting weight or any combination thereof. In some embodiments, the controller may also be communication with an orientation sensor 606 which, may be optional.

In some embodiments, the steering member 608 and at least one braking member 610, as discussed elsewhere herein, may be used in combination to provide improved safety to the self-balancing vehicle. In some embodiments, the resistance to movement of the steering member and the resistance to motion of wheels against the support surface may be controllable based upon an operating state or change thereof of the vehicle. The operating state may be selected from the group consisting of a state of the at least one balancing member and a degree of tilt of vehicle body with respect to the gravitational acceleration vector.

In some examples, when the balancing member is in an operational state, the resistance to movement of the steering member may be increased before the state of the balancing member transitions from an operational state to a non-operational state, and meanwhile, the resistance to motion of the wheels may be increased so as to prevent an increase in a velocity of the self-balancing vehicle. For instance, when the gimbal angle of a CMG reaches 80% of a predetermined gimbal angle limit, the one or more computer processors of the controller may be, individually or collectively programmed to increase the resistance to movement of the steering member, and meanwhile, to increase the resistance to motion of the wheels so as to prevent an increase in a velocity of the self-balancing vehicle. In this circumstance, for example, the driver may be capable of continuing to turn the steering wheel until the gimbal angle of the CMG reaches the predetermined gimbal angle limit (e.g., 45 degree); however, the driver is not able to increase the velocity of the vehicle, until the gimbal angle of the CMG decreases to less than 80% of the predetermined gimbal angle limit.

In some examples, a movement of the steering member may be prohibited upon the state of the balancing member transitioning from an operational state to a non-operational state, and meanwhile, the resistance to motion of the wheels may be increased so as to decrease a velocity of the self-balancing vehicle. For instance, when the rate of rotation of a flywheel reaches a predetermined limit of rate of rotation (e.g., 7000 rpm), the one or more computer processors of the controller may be individually or collectively programmed to increase the resistance to movement of the steering member to prohibit a further movement of the steering member, and meanwhile, to increase the resistance to motion of the wheels so as to decrease a velocity of the self-balancing vehicle. In this circumstance, for example, the driver may not be able to continue to turn the steering wheel or increase or maintain the velocity of the vehicle, until the rate of rotation of a flywheel decreases to less than 80% of the predetermined limit of rate of rotation.

In some embodiments, one or more orientation sensor 606 may be provided in communication with the controller. The orientation sensor may be onboard the vehicle to measure an orientation of the vehicle body. In some examples, the one or more computer processors of the controller may be individually or collectively programmed to increase the resistance to movement of the steering member and the resistance to motion of wheels when the degree of tilt of the vehicle body with respect to the gravitational acceleration vector reaches a predetermined orientation threshold (e.g., 30 degree). In other examples, the one or more computer processors may instruct to increase the resistance to movement of the steering member and the resistance to motion of wheels when a change in the degree of tilt of the vehicle body with respect to the gravitational acceleration vector reaches a predetermined orientation threshold, such as 5 degree per second. In some examples, the one or more computer processors of the controller may be individually or collectively programmed to increase the resistance to movement of the steering member and the resistance to motion of wheels so as to provide feedback to driver of the vehicle with the operating state of the balancing member and prevent an increase in a velocity of the self-balancing vehicle, before the degree of tilt or change thereof with respect to the gravitational acceleration vector reaches the predetermined threshold, such as 30 degree or 5 degree per second. In other examples, the one or more computer processors of the controller may be individually or collectively programmed to increase the resistance to movement of the steering member and the resistance to motion of wheels so as to prohibit a further movement of the steering member and decrease a velocity of the self-balancing vehicle, upon the degree of tilt or change thereof with respect to the gravitational acceleration vector reaching the predetermined threshold.

Figure 7:
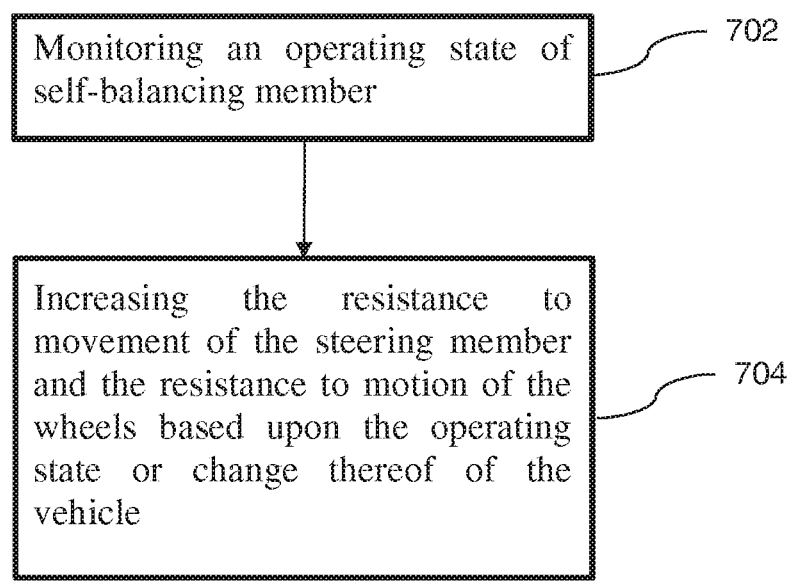
FIG. 7 schematically illustrates a method of operating a vehicle, such as a self-balancing vehicle, in accordance with some embodiments of the present disclosure.

FIG. 7 schematically illustrates a method of operating a vehicle, such as a self-balancing vehicle, in accordance with some embodiments of the present disclosure. The self-balancing vehicle may comprise (i) a vehicle body having a first axis (e.g., a longitudinal axis), (ii) at least two wheels aligned substantially along the first axis, each of the at least two wheels being configured to support the vehicle body against a support surface, and at least one of the at least two wheels being rotatable along a second axis that is angled with respect to the first axis, (iii) at least one balancing member disposed within the vehicle body, the balancing member facilitating self-balancing of the vehicle body against the support surface, and (iv) a steering member coupled to the at least one of the at least two wheels, the steering member being movable to provide rotation of the at least one of the at least two wheels along the second axis, a resistance to movement of the steering member being controllable based upon an operating state or change thereof of the vehicle. In some embodiments, the self-balancing vehicle may also comprise at least one braking member which is coupled to at least one of the at least two wheels. The at least one braking member may control a resistance to motion of the at least one of the at least two wheels against the support surface based upon an operating state or change thereof of the vehicle. The operating state may be selected from the group consisting of, a state of the at least one balancing member and a degree of tilt of the vehicle body with respect to the gravitational acceleration vector.

In operation 702, an operating state of the self-balancing vehicle may be monitored. In some examples, the monitoring may comprise detecting the operating state of the vehicle or change thereof and/or a degree of tilt with respect to the gravitational acceleration vector. For instance, a gimbal angle of the CMG may be monitored by a controller onboard the vehicle.

Then, in operation 704, the resistance to movement of the steering member and the resistance to motion of the wheels may be increased based upon the operating state or change, thereof of the vehicle. In some examples, when the balancing member is in an operational state, the resistance to movement of the steering member may be increased before the state of the balancing member transitions from an operational state to a non-operational state, additionally or alternatively, the resistance to motion of the wheels may be increased so as to prevent an increase in a velocity of the self-balancing vehicle, as discussed elsewhere herein. In some examples, a movement of the steering member may be prohibited upon the state of the balancing member transitioning from an operational state to a non-operational state, additionally or alternatively, the resistance to motion of the wheels may be increased so as to decrease a velocity of the self-balancing vehicle, as discussed elsewhere herein.

Figure 8:
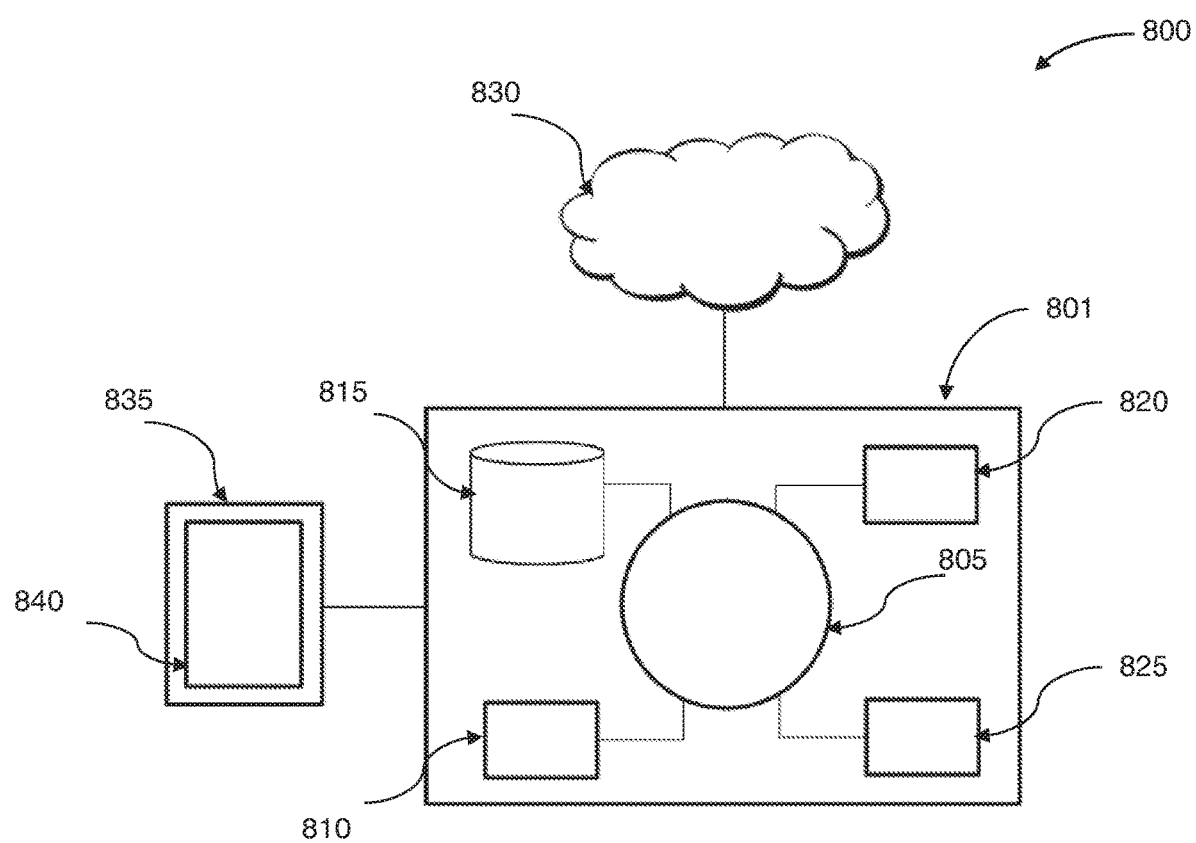
FIG. 8 schematically illustrates an example of a computer control system that is programmed or otherwise configured to implement methods provided herein, in accordance with some embodiments of the present disclosure.

The present disclosure provides computer control systems that are programmed to implement methods of the disclosure. FIG. 8 shows an example of a computer system 801 that is programmed or otherwise configured to implement methods provided herein, in accordance with some embodiments of the present disclosure. The computer system 801 can regulate various aspects of the self-balancing vehicle of the present disclosure, such as, for example, monitoring an operating state of the self-balancing vehicle, controlling the resistance to movement of the steering member and/or controlling the resistance to motion of the wheels based upon the operating state or change thereof of the vehicle.

The computer system 801 may include a central processing unit (CPU, also "processor" and "computer processor" herein) 805, which can be a single core or multi core processor, or a plurality of processors for parallel processing. The computer system 801 may also include memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory data storage and/or electronic display adapters. The memory 810, storage unit 815, interface 820 and peripheral devices 825 may be in communication with the CPU 805 through a communication bus (solid lines), such as a motherboard. The storage unit 815 can be a data storage unit (or data repository) for storing data. The computer system 801 can be operatively coupled to a computer network ("network") 830 with the aid of the communication interface 820. The network 830 can be the Internet, an internet and/or extranet, or an intranet and/or extranet that is in communication with the Internet. The network 830 in some cases may be a telecommunication and/or data network. The network 830 can include one or more computer servers, which can enable distributed computing, such as cloud computing. The network 830, in some cases with the aid of the computer system 801, can implement a peer-to-peer network, which may enable devices coupled to the computer system 801 to behave as a client or a server.

The CPU 805 can execute a sequence of machine-readable instructions, which can be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 can include fetch, decode, execute, and write-back.

The CPU 805 can be part of a circuit, such as an integrated circuit. One or more other components of the system 801 can be included in the circuit. In some cases, the circuit is an application specific integrated circuit (ASIC).

The storage unit 815 can store files, such as drivers, libraries and saved programs. The storage unit 815 can store user data, e.g., user preferences and user programs. The computer system 801 in some cases can include one or more additional data storage units that are external to the computer system 801, such as located on a remote server that is in communication with the computer system 801 through an intranet or the Internet.

The computer system 801 can communicate with one or more remote computer systems through the network 830. For instance, the computer system 801 can communicate with a remote computer system of a user. Examples of remote computer systems may include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 801 via the network 830.

Methods as described herein can be implemented by way of machine (e.g., computer processor) executable code stored on an electronic storage location of the computer system 801, such as, for example, on the memory 810 or electronic storage unit 815. The machine executable or machine readable code can be provided in the form of software. During use, the code can be executed by the processor 805. In some eases, the code can be retrieved from the storage unit 815 and stored on the memory 810 for ready access by the processor 805. In some situations, the electronic storage unit 815 can be precluded, and machine-executable instructions are stored on memory 810.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 can include or be in communication with an electronic display 835 that comprises a user interface (UI) 840 for providing, for example, degree of tile of the vehicle body, operating state of the self-balancing members, driving velocity of the vehicle, extending/retracting status of the auxiliary support members. Examples of UI's include, without limitation, a graphical user interface (GUI) and web-based user interface.

Figure 9:
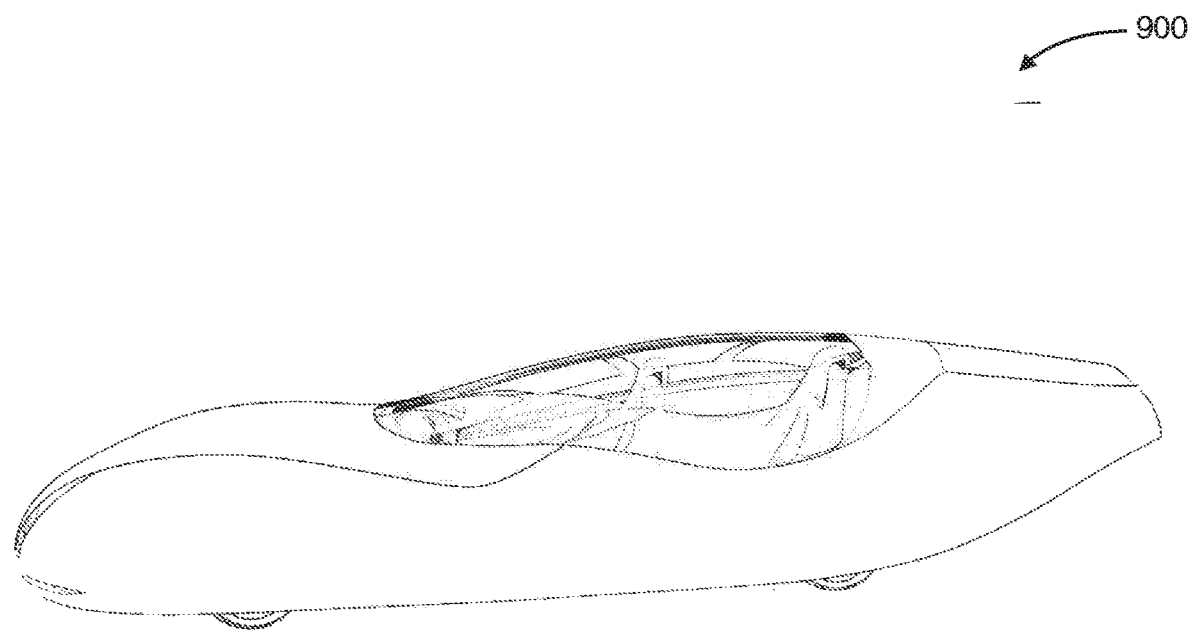
FIG. 9 illustrates an example of a two-wheeled vehicle, in accordance with embodiments of the present disclosure.

FIG. 9 illustrates an example of a two-wheeled vehicle, in accordance with some embodiments of the present disclosure. The two-wheeled vehicle includes a front wheel and a rear wheel. The two-wheeled vehicle can be a self-balancing vehicle, as described elsewhere herein.

The systems, devices, and methods described herein can be applied to a wide variety of vehicles, including mono (or single) wheeled vehicle, two-wheeled vehicle and three wheeled vehicle. A mono-wheeled vehicle or a three-wheeled vehicle may turn over if compared to a four wheeled vehicle, and may require auxiliary support members to provide stability.

The systems, devices, and methods described herein can be applied to a wide variety of movable objects. The movable object may be capable of moving freely along one, two or three degrees of freedom. For example, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a motor, as described elsewhere herein, or by a user. The propulsion system may be run on an energy source, such as electrical energy, magnetic energy, solar energy, wind energy, gravitational energy, chemical energy, nuclear energy, or any suitable combination thereof. Alternatively, the movable object may be carried by a living being, such as by a user pedaling.

The movable object can be controlled remotely by a user or controlled locally by an occupant within or on the movable object. The movable object may be controlled remotely via an occupant within, a separate vehicle. In some embodiments, the movable object is vehicle, such as a mono-wheel vehicle, a two wheeled vehicle, or a three wheeled vehicle. The movable object may be manned or unmanned. An unmanned object may not have an occupant onboard the movable object. The unmanned object may be controlled by a computer, such as a robot. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be greater than a size and/or dimension suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 in, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^33$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 10,000 kg. The weight of the movable object may be less than or equal to about: 9,000 kg, 8,000 kg, 7,000 kg, 6,000 kg, 5,000 kg, 4,000 kg, 3000 kg, 2,000 kg, 1,000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, the movable object may have low energy consumption. For example, the movable object may use less than about: 50 W/h, 40 W/h, 30 W/h, 20 W/h, 10 W/h, 5 W/h, 4 W/h, 3 W/h, 2 W/h, 1 W/h, or less.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. The load may be movable relative to the movable object (e.g., translatable or rotatable relative to the movable object). The load can include a payload and/or a carrier, as described elsewhere herein.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A self-balancing vehicle, comprising:
a vehicle body having a first axis;
at least two wheels aligned substantially along said first axis, wherein each of said at least two wheels is configured to support said vehicle body against a support surface, and wherein at least one of said at least two wheels is rotatable along a second axis that is angled with respect to said first axis;

at least one balancing member disposed within said vehicle body, wherein said balancing member facilitates self-balancing of said vehicle body against said support surface;

a steering member coupled to said at least one of said at least two wheels, wherein said steering member is movable to provide rotation of said at least one of said at least two wheels along said second axis, wherein a resistance to movement of said steering member is controllable based upon an operating state or change thereof of said vehicle, which operating state is selected from the group consisting of a state of said at least one balancing member and a degree of tilt with respect to the gravitational acceleration vector; and a controller in communication with said steering member and said at least one balancing member, wherein said controller comprises one or more computer processors that are individually or collectively programmed to control said resistance to movement of said steering, member based upon said operating state or change thereof of said vehicle;

said state of said at least one balancing member is indicative of said balancing member being in an operational state, and wherein said one or more computer processors are individually or collectively programmed to (i) detect said degree of tilt or change thereof with respect to the gravitational acceleration vector, and (ii) control said resistance to movement based upon said degree of tilt or change thereof;

wherein said one or more computer processors are individually or collectively programmed to increase said resistance to movement of said steering member when said degree of tilt or change thereof with respect to the gravitational acceleration vector reaches a predetermined orientation threshold.

2. The self-balancing vehicle of claim 1, wherein said state of said at least one balancing member is an operational state, a faulty state or a non-operational state.

3. The self-balancing vehicle of claim 1, wherein said one or more computer processors are individually or collectively programmed to direct said steering member to increase or decrease said resistance to movement.

4. The self-balancing vehicle of claim 1, wherein said state of said at least one balancing member is indicative of said balancing member being in an operational state, and wherein said one or more computer processors are individually or collectively programmed to (i) detect said state of said at least one balancing member, and (ii) control said resistance to movement of said steering member based upon said state of said at least one balancing member.

5. The self-balancing vehicle of claim 1, wherein said balancing member includes a control moment gyroscope (CMG), said operating state of the CMG is determined based upon whether a gimbal angle of the CMG with respect to the vehicle body reaches a predetermined gimbal angle limit.

6. The self-balancing vehicle of claim 1, wherein said balancing member includes a flywheel, said operating state of said at least one balancing member comprises an operating state of said flywheel that is determined based upon whether a rate of rotation of said flywheel reaches a predetermined limit.

7. The self-balancing vehicle of claim 1, wherein said first axis is a longitudinal axis.

8. The self-balancing vehicle of claim 1, wherein said second axis is angled with respect to said first axis at an angle greater than 0°, said angle is greater than or equal to 25°.

9. The self-balancing vehicle of claim 1, further comprising at least one braking member coupled to at least one of said at least two wheels, said at least one braking member controls a resistance to motion of said at least one of said at least two wheels against said support surface based upon said operating state or change thereof of said vehicle.

10. The self-balancing vehicle of claim 5, wherein said one or more computer processors are individually or collectively programmed to increase said resistance to movement of said steering member when said gimbal angle of the CMG reaches 80% of the predetermined gimbal angle limit.

11. A self-balancing vehicle, comprising:
a vehicle body having a first axis;
at least two wheels, aligned substantially along said first axis, wherein each of said at least two wheels is configured to support said vehicle body against a support surface;
at least one balancing member disposed within said vehicle body, wherein said balancing member facilitates self-balancing of said vehicle body against said support surface;
at least one braking member coupled to at least one of said at least two wheels, wherein said at least one braking member controls a resistance to motion of said at least one of said at least two wheels against said support surface based upon an operating state or change thereof of said vehicle, which operating state is selected from the group consisting of a state of said at least one balancing member and a degree of tilt with respect to the gravitational acceleration vector; and
a controller in communication with said at least one braking member and said at least one balancing member, wherein said controller comprises one or more computer processors that are individually or collectively programmed to control said resistance to motion based upon said operating state or change thereof of said vehicle;
wherein said balancing member includes a flywheel, said state of said at least one balancing member includes an operating state of the flywheel that is determined based upon whether a rate of rotation of said flywheel reaches a predetermined limit.

12. A method for operating a self-balancing vehicle, wherein the self-balancing vehicle is the self-balancing vehicle as claimed in claim 1, the method comprises:
(a) monitoring an operating state of said self-balancing, vehicle adjacent to a support surface; and
(b) controlling said resistance to movement of said steering member based upon said operating state or change thereof of said vehicle.

13. The method of claim 12, wherein said state of said at least one balancing member is indicative of said balancing member being in a faulty or non-operational state, and said controlling comprises controlling said resistance to movement when said balancing member is in said faulty or non-operational state.

14. The method of claim 12, wherein said state of said at least one balancing member is indicative of said balancing member being in an operational state, and wherein said monitoring comprises detecting said state of said at least one balancing member, and wherein said controlling comprises controlling said resistance to movement of said steering member based upon said state of said at least one balancing member.

15. The method of claim 12, wherein said state of said at least one balancing, member is indicative of said balancing member being in an operational state, and wherein said monitoring comprises detecting said degree of tilt or change thereof with respect to the gravitational acceleration vector, and wherein said controlling comprises controlling said resistance to movement based upon said degree of tilt or change thereof.

16. The method of claim 12, wherein said balancing member includes a control moment gyroscope (CMG), said operating state of the CMG is determined based upon whether a gimbal angle of the CMG with respect to the vehicle body reaches a predetermined gimbal angle limit, said controlling comprises increasing said resistance to movement of said steering member when said gimbal angle of the CMG reaches 80% of the predetermined gimbal angle limit.

17. The method of claim 12, wherein said balancing member includes a flywheel, said operating state of said at least one balancing member includes an operating state of said flywheel that is determined based upon whether a rate of rotation of said flywheel reaches a predetermined limit, said controlling comprises increasing said resistance to movement of said steering member when said rate of rotation of said flywheel reaches 80% of said predetermined limit.

18. A method for operating a self-balancing vehicle, wherein the self-balancing vehicle is the self-balancing vehicle as claimed in the claim 11, the method comprising:
    (a) monitoring an operating state of said self-balancing vehicle adjacent to a support surface; and
    (b) controlling said resistance to motion based upon said operating state or change thereof of said vehicle.

* * * * *